(12) United States Patent
Hood et al.

(10) Patent No.: US 7,672,737 B2
(45) Date of Patent: *Mar. 2, 2010

(54) HIERARCHICALLY STRUCTURED DATA MODEL FOR UTILIZATION IN INDUSTRIAL AUTOMATION ENVIRONMENTS

(75) Inventors: Gavan W. Hood, Upper Lockyer (AU); Ralph Kappelhoff, Milwaukee, WI (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 616 days.

This patent is subject to a terminal disclaimer.

(21) Appl. No.: 11/240,335

(22) Filed: Sep. 30, 2005

(65) Prior Publication Data

US 2006/0259154 A1 Nov. 16, 2006

Related U.S. Application Data

(60) Provisional application No. 60/680,682, filed on May 13, 2005.

(51) Int. Cl.
*G05B 15/00* (2006.01)
(52) U.S. Cl. ................... 700/1; 700/86; 700/95
(58) Field of Classification Search ............ 700/1–4, 700/17, 95, 86; 717/163; 709/246
See application file for complete search history.

(56) References Cited

U.S. PATENT DOCUMENTS

| | | | |
|---|---|---|---|
| 4,268,901 A | 5/1981 | Subrizi et al. | |
| 4,347,564 A | 8/1982 | Sugano et al. | |
| 4,623,964 A | 11/1986 | Getz et al. | |
| 4,990,838 A | 2/1991 | Kawato et al. | |
| 5,072,374 A | 12/1991 | Sexton et al. | |
| 5,185,708 A | 2/1993 | Hall et al. | |
| 5,253,184 A | 10/1993 | Kleinschnitz | |
| 5,282,244 A | 1/1994 | Fuller et al. | |
| 5,301,320 A | 4/1994 | McAtee et al. | |
| 5,446,868 A | 8/1995 | Gardea et al. | |
| 5,455,775 A | 10/1995 | Huber et al. | |
| 5,485,620 A | 1/1996 | Sadre et al. | |
| 5,504,891 A | 4/1996 | Motoyama et al. | |
| 5,537,585 A | 7/1996 | Blickenstaff et al. | |
| 5,572,731 A | 11/1996 | Morel et al. | |
| 5,611,059 A | 3/1997 | Benton et al. | |
| 5,619,724 A | 4/1997 | Moore | |

(Continued)

OTHER PUBLICATIONS

Pitzek et al., Configuration and Management of a Real-Time Smart Transducer Network, 2003 IEEE, 2003, 4 pages.

(Continued)

*Primary Examiner*—Albert DeCady
*Assistant Examiner*—Steven R Garland
(74) *Attorney, Agent, or Firm*—Turocy & Watson LLP; William R. Walbrun

(57) ABSTRACT

An industrial automation device comprises a data storage component that retains at least a portion of a schema, the schema facilitates usage of a hierarchically structured data model by the industrial automation device. A processor is communicatively coupled to the data storage component and facilitates at least one of receipt, execution, and creation of an object that conforms to the hierarchically structured data model. In another example, the industrial automation device can be employed to execute a workflow.

30 Claims, 17 Drawing Sheets

U.S. PATENT DOCUMENTS

| | | | |
|---|---|---|---|
| 5,634,048 A | 5/1997 | Ryu et al. | |
| 5,644,740 A | 7/1997 | Kiuchi | |
| 5,675,748 A | 10/1997 | Ross | |
| 5,715,413 A | 2/1998 | Ishai et al. | |
| 5,721,905 A | 2/1998 | Elixmann et al. | |
| 5,761,499 A | 6/1998 | Sondregger | |
| 5,790,935 A | 8/1998 | Payton | |
| 5,797,137 A | 8/1998 | Golshani et al. | |
| 5,812,773 A | 9/1998 | Norin | |
| 5,828,851 A | 10/1998 | Nixon et al. | |
| 5,832,486 A | 11/1998 | Itoh et al. | |
| 5,838,563 A | 11/1998 | Dove et al. | |
| 5,848,273 A | 12/1998 | Fontana et al. | |
| 5,862,052 A | 1/1999 | Nixon et al. | |
| 5,884,025 A | 3/1999 | Baehr et al. | |
| 5,884,033 A | 3/1999 | Duvall et al. | |
| 5,913,029 A | 6/1999 | Shostak | |
| 5,924,094 A | 7/1999 | Sutter | |
| 5,936,539 A | 8/1999 | Fuchs | |
| 5,940,294 A | 8/1999 | Dove | |
| 5,940,854 A | 8/1999 | Green, Jr. et al. | |
| 5,951,440 A | 9/1999 | Reichlinger | |
| 5,960,420 A | 9/1999 | Leymann et al. | |
| 5,966,705 A | 10/1999 | Koneru | |
| 5,970,494 A | 10/1999 | Velissaropoulos et al. | |
| 5,978,577 A | 11/1999 | Rierden et al. | |
| 5,980,078 A | 11/1999 | Krivoshein et al. | |
| 5,983,016 A | 11/1999 | Brodsky et al. | |
| 6,011,899 A | 1/2000 | Ohishi et al. | |
| 6,032,208 A | 2/2000 | Nixon et al. | |
| 6,044,217 A | 3/2000 | Brealey et al. | |
| 6,061,740 A * | 5/2000 | Ferguson et al. | 709/246 |
| 6,063,129 A | 5/2000 | Dadd et al. | |
| 6,081,899 A | 6/2000 | Byrd | |
| 6,098,116 A | 8/2000 | Nixon et al. | |
| 6,101,531 A | 8/2000 | Eggleston et al. | |
| 6,195,591 B1 | 2/2001 | Nixon et al. | |
| 6,208,987 B1 | 3/2001 | Nihei | |
| 6,234,899 B1 | 5/2001 | Nulph | |
| 6,266,726 B1 | 7/2001 | Nixon et al. | |
| 6,275,977 B1 | 8/2001 | Nagai et al. | |
| 6,308,168 B1 | 10/2001 | Dovich et al. | |
| 6,308,224 B1 | 10/2001 | Leymann et al. | |
| 6,311,187 B1 | 10/2001 | Jeyaraman | |
| 6,327,511 B1 | 12/2001 | Naismith et al. | |
| 6,336,152 B1 | 1/2002 | Richman et al. | |
| 6,356,920 B1 | 3/2002 | Vandersluis | |
| 6,377,957 B1 | 4/2002 | Jeyaraman | |
| 6,393,566 B1 | 5/2002 | Levine | |
| 6,398,106 B1 | 6/2002 | Ulvr et al. | |
| 6,409,082 B1 | 6/2002 | Davis et al. | |
| 6,411,987 B1 | 6/2002 | Steger et al. | |
| 6,415,983 B1 | 7/2002 | Ulvr et al. | |
| 6,425,051 B1 | 7/2002 | Burton et al. | |
| 6,438,744 B2 | 8/2002 | Toutonghi et al. | |
| 6,445,963 B1 | 9/2002 | Blevins et al. | |
| 6,446,202 B1 | 9/2002 | Krivoshein et al. | |
| 6,457,053 B1 | 9/2002 | Satagopan et al. | |
| 6,469,986 B1 | 10/2002 | Lecheler et al. | |
| 6,473,656 B1 | 10/2002 | Langels et al. | |
| 6,477,435 B1 * | 11/2002 | Ryan et al. | 700/86 |
| 6,484,061 B2 | 11/2002 | Papadopoulos et al. | |
| 6,501,996 B1 | 12/2002 | Bieber | |
| 6,505,247 B1 | 1/2003 | Steger et al. | |
| 6,510,352 B1 | 1/2003 | Badavas et al. | |
| 6,539,271 B2 | 3/2003 | Lech et al. | |
| 6,539,430 B1 | 3/2003 | Humes | |
| 6,539,458 B2 | 3/2003 | Holmberg | |
| 6,615,091 B1 | 9/2003 | Birchenough et al. | |
| 6,631,519 B1 | 10/2003 | Nicholson et al. | |
| 6,643,555 B1 | 11/2003 | Eller et al. | |
| 6,661,426 B1 | 12/2003 | Jetha et al. | |
| 6,664,981 B2 | 12/2003 | Ashe et al. | |
| 6,681,227 B1 | 1/2004 | Kojima et al. | |
| 6,687,817 B1 | 2/2004 | Paul | |
| 6,697,797 B1 | 2/2004 | Hoggatt et al. | |
| 6,704,746 B2 | 3/2004 | Sokolov et al. | |
| 6,714,949 B1 | 3/2004 | Frey, Jr. | |
| 6,714,981 B1 | 3/2004 | Skaggs | |
| 6,738,821 B1 | 5/2004 | Wilson et al. | |
| 6,745,089 B2 | 6/2004 | Rasmussen et al. | |
| 6,748,486 B2 | 6/2004 | Burton et al. | |
| 6,751,634 B1 | 6/2004 | Judd | |
| 6,758,403 B1 | 7/2004 | Keys et al. | |
| 6,760,721 B1 | 7/2004 | Chasen et al. | |
| 6,760,732 B2 | 7/2004 | Busshart et al. | |
| 6,763,395 B1 | 7/2004 | Austin | |
| 6,766,312 B2 | 7/2004 | Landt | |
| 6,768,987 B1 | 7/2004 | Couch et al. | |
| 6,769,095 B1 | 7/2004 | Brassard et al. | |
| 6,778,537 B1 | 8/2004 | Ishibashi | |
| 6,801,822 B1 | 10/2004 | Fujiwara et al. | |
| 6,807,632 B1 | 10/2004 | Carpentier et al. | |
| 6,809,732 B2 | 10/2004 | Zatz et al. | |
| 6,832,120 B1 * | 12/2004 | Frank et al. | 700/65 |
| 6,836,892 B2 | 12/2004 | Ikoma et al. | |
| 6,839,790 B2 | 1/2005 | Barros De Almeida et al. | |
| 6,842,769 B1 | 1/2005 | Kim et al. | |
| 6,853,920 B2 | 2/2005 | Hsiung et al. | |
| 6,865,509 B1 | 3/2005 | Hsiung et al. | |
| 6,868,413 B1 | 3/2005 | Grindrod et al. | |
| 6,874,145 B1 | 3/2005 | Ye et al. | |
| 6,874,146 B1 | 3/2005 | Iyengar | |
| 6,880,060 B2 | 4/2005 | Talagala et al. | |
| 6,889,282 B2 | 5/2005 | Schollenberger | |
| 6,901,578 B1 | 5/2005 | Beaven et al. | |
| 6,904,473 B1 | 6/2005 | Bloxham et al. | |
| 6,920,474 B2 | 7/2005 | Walsh et al. | |
| 6,928,521 B1 | 8/2005 | Burton et al. | |
| 6,930,985 B1 | 8/2005 | Rathi et al. | |
| 6,934,749 B1 | 8/2005 | Black et al. | |
| 6,938,079 B1 | 8/2005 | Anderson et al. | |
| 6,944,626 B2 | 9/2005 | Cameron et al. | |
| 6,947,947 B2 | 9/2005 | Block et al. | |
| 6,950,900 B1 | 9/2005 | McKean et al. | |
| 6,954,770 B1 | 10/2005 | Carlson et al. | |
| 6,961,728 B2 | 11/2005 | Wynblatt et al. | |
| 6,973,556 B2 | 12/2005 | Milligan et al. | |
| 6,975,913 B2 | 12/2005 | Kreidler et al. | |
| 7,146,355 B2 | 12/2006 | Chu-Caroll | |
| 7,162,312 B2 | 1/2007 | Gross et al. | |
| 7,171,476 B2 | 1/2007 | Maeda et al. | |
| 7,225,193 B2 | 5/2007 | Mets et al. | |
| 7,251,222 B2 | 7/2007 | Chen et al. | |
| 7,308,454 B2 * | 12/2007 | Abineri et al. | 707/101 |
| 2002/0007286 A1 | 1/2002 | Okamoto | |
| 2002/0012401 A1 | 1/2002 | Karolys et al. | |
| 2002/0013748 A1 | 1/2002 | Edmison et al. | |
| 2002/0069167 A1 | 6/2002 | Conlow | |
| 2002/0073236 A1 | 6/2002 | Helgeson et al. | |
| 2002/0087786 A1 | 7/2002 | Burton et al. | |
| 2002/0091838 A1 | 7/2002 | Rupp et al. | |
| 2002/0103785 A1 | 8/2002 | Harvey | |
| 2002/0131404 A1 | 9/2002 | Mehta et al. | |
| 2002/0161827 A1 | 10/2002 | Brault | |
| 2002/0188366 A1 | 12/2002 | Pepper et al. | |
| 2002/0194577 A1 | 12/2002 | Connor et al. | |
| 2003/0014387 A1 | 1/2003 | Kreidler et al. | |
| 2003/0036876 A1 | 2/2003 | Fuller et al. | |
| 2003/0065673 A1 | 4/2003 | Grobler et al. | |
| 2003/0090514 A1 | 5/2003 | Cole et al. | |
| 2003/0120710 A1 | 6/2003 | Pulsipher et al. | |
| 2003/0123467 A1 | 7/2003 | Du et al. | |
| 2003/0126308 A1 | 7/2003 | Kim | |

| | | |
|---|---|---|
| 2003/0172145 A1 | 9/2003 | Nguyen |
| 2003/0177114 A1 | 9/2003 | Lin et al. |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0098269 A1 | 5/2004 | Wise et al. |
| 2004/0117624 A1 | 6/2004 | Brandt et al. |
| 2004/0153171 A1 | 8/2004 | Brandt et al. |
| 2004/0167790 A1 | 8/2004 | Grasse |
| 2004/0193449 A1 | 9/2004 | Wildman et al. |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2004/0268186 A1* | 12/2004 | Maturana et al. ............. 714/38 |
| 2005/0005289 A1 | 1/2005 | Adolph et al. |
| 2005/0015397 A1 | 1/2005 | Abineri et al. |
| 2005/0044112 A1 | 2/2005 | Yamamoto et al. |
| 2005/0065626 A1 | 3/2005 | Kappelhoff et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0193118 A1 | 9/2005 | Le et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |
| 2006/0064428 A1* | 3/2006 | Colaco et al. ............. 707/101 |
| 2006/0173895 A1 | 8/2006 | Engquist et al. |
| 2006/0195817 A1 | 8/2006 | Moon |
| 2006/0212855 A1* | 9/2006 | Bournas et al. ............. 717/140 |
| 2007/0268922 A1* | 11/2007 | Dougan et al. ............. 370/401 |

OTHER PUBLICATIONS

European Search Report dated Jun. 12, 2005 for European Patent Application Serial No. EP05016793, 3 pages.
John Kubiatowicz, et al. "OceanStore: An Architecture for Global-Scale Persistent Storage" ASPLOS 2000, Cambridge, Massachusetts (2000).
Roy Goldman, et al. "From Semistructured Data to XML: Migrating the Lore Data Model and Query Language" (1999).
International Search Report & Written Opinion dated Jun. 19, 2008 for PCT Application Serial No. PCT/US06/18350, 12 Pages.
OA dated Oct. 8, 2008 for U.S. Appl. No. 11/238,607, 32 pages.
ISR mailed Jul. 7, 2008 for PCT Application No. PCT/ US06/ 18180, 2 pages.
OA dated Mar. 6, 2009 for U.S. Appl. No. 11/238,607, 61 pages.
OA dated Apr. 2, 2008 for U.S. Appl. No. 11/238,607, 37 pages.
OA dated May 1, 2009 for U.S. Appl. No. 11/239,567, 35 pages.
OA dated May 30, 2008 for U.S. Appl. No. 11/239,567, 29 pages.
ISR mailed Mar. 4, 2008 for PCT Application No. PCT/ US06/ 18181, 2 pages.
OA dated Nov. 14, 2008 for U.S. Appl. No. 11/239,567, 34 pages.
OA dated Nov. 2, 2007 for U.S. Appl. No. 11/239,567, 23 pages.
OA dated Jun. 3, 2009 for U.S. Appl. No. 11/238,606, 25 pages.
OA dated Jul. 2, 2008 for U.S. Appl. No. 11/238,606, 17 pages.
OA dated Jan. 18, 2008 for U.S. Appl. No. 11/238,606, 8 pages.
OA dated Nov. 20, 2008 for U.S. Appl. No. 11/238,606, 19 pages.
OA dated Apr. 22, 2008 for U.S. Appl. No. 11/238,537, 48 pages.
OA dated Apr. 15, 2009 for U.S. Appl. No. 11/238,537, 22 pages.
Ozsoyoglu, et al. Database Systems for Programmable Logic Contollers. Last accessed Apr. 15, 2009, 17 pages.
OA dated Oct. 20, 2008 for U.S. Appl. No. 11/238,537, 44 pages.
ISR mailed May 6, 2008 for PCT Application No. PCT/ US06/ 18122, 1 page.
ISR mailed Jan. 24, 2008 for PCT Application No. PCT/ US06/ 18238, 1 page.

* cited by examiner

HIERARCHICALLY STRUCTURED DATA MODEL FOR UTILIZATION IN INDUSTRIAL AUTOMATION ENVIRONMENTS

CROSS-REFERENCE TO RELATED APPLICATION

This application claims the benefit of U.S. Provisional Patent Application Ser. No. 60/680,682, filed on May 13, 2005 and entitled SCHEMA THAT FACILITATES PLANT REPRESENTATION AND RELATED FUNCTIONALITY, the entirety of which is incorporated herein by reference.

TECHNICAL FIELD

The subject invention relates to industrial control systems and, more particularly, to employment of a schema within industrial devices.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involves assembly of previously processed materials. Often, such as in the case of automobiles, complex assemblies can be manufactured with high technology robotics assisting the industrial control process.

In many automated processes, including the basic production of commodities such as food, beverages, and pharmaceuticals, complex state logic is often designed and programmed by systems Engineers or provided in some cases by automated equipment manufacturers. This logic is often programmed with common PLC ladder logic or higher level languages supported by Sequential Function Charts or Function Blocks. Sequence logic can be employed for a plurality of tasks such as material movement and conveying operations, packaging operations, or as part of an assembly process itself, wherein various stages of an assembly are sequenced from stage to stage until a final assembly occurs. As can be appreciated, much planning and design is required to implement an automated production process that can involve hundreds of machines, computers, and program logic to facilitate proper operation of the respective sequences.

A common problem associated with control systems is lack of uniformity across system/process boundaries, as well as a lack of uniformity between controller manufacturers, software vendors, and customers. Such non-uniformity can be as simplistic as discrepancies in naming conventions between a software vendor and a customer, or as complex as disparate software representations with respect to portions of an industrial automation framework. Given the above-mentioned discrepancies (as well as a myriad of other discrepancies), a substantial amount of ad-hoc coding is often required to automate a process. Accordingly, significant cost is incurred by a manufacturer to employ computer and programming specialists to generate and maintain ad-hoc programs necessary to automate a manufacturing process. This cost is then passed on to purchasers of the manufactured product.

With more detail regarding conventional controllers, such controllers have been designed to efficiently undertake real-time control. For instance, conventional programmable logic controllers, robotic controllers, numeric controllers, smart devices, and the like receive data from sensors and, based upon the received data, control an actuator, drive, or the like. These devices recognize a source and/or destination of the data by way of a symbol and/or address associated with a source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

As can be discerned from the above, data associated with conventional industrial controllers is created, delivered, and/or stored with a flat namespace data structure. In other words, all that can be discovered by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

The flat data model associated with conventional industrial automation devices is associated with several deficiencies. For instance, correlating factory data to related data is an extremely difficult task when employing a conventional flat data structure. More particularly, an operator or hired individual reviews the data and manually generates correlation. Such manual correlation results in possibility of error and several man-hours. Furthermore, user interfaces cannot be generated efficiently—rather, standard templates are utilized with no regard for user context.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to control of industrial systems/processes. To effectuate control of an industrial system, at least a portion of a schema that can be utilized in connection with implementation of a hierarchically structured data model can be retained within an industrial automation device, such as a programmable logic controller, a numeric controller, a robotic controller, a smart device, a switch, a router, a proxy, a gateway, etc. The schema enables instantiation of objects that conform to a hierarchically structured data model, wherein the objects can be representative of an industrial system, device, process, sub-process, and the like. Incorporating the schema directly within the industrial device facilitates permeation of a common data model throughout an industrial automation environment. Associations between objects can be defined within the schema, as well as inheritance properties and the like. State machines can be associated with objects to indicate a state (e.g., hold, abort, and the like). In one example, the schema can be designed to enable instantiation of data objects that are in accordance with international industrial standards ISA S88, ISA S95, OMAC, a combination thereof, or any other suitable industrial standard. Thus, the schema can enable instantiation of unit procedure objects, equipment procedure objects, or any other suitable objects within a hierarchy.

Through utilization of the schema, various functionalities can be enabled. For instance, objects can be designed to effectuate an industrial process and sold through a network connection (e.g., the Internet). In another example, data can be retrieved directly from controllers and utilized to dynamically generate user interfaces with respect to a process. Utilizing such data is beneficial, as controllers can be employed to generate a most-accurate representation of a manufacturing environment. Furthermore, given a representation of an entire manufacturing process (e.g., across process boundaries), seamless tracking and tracing from a beginning of manufacture to end is enabled. For instance, the schema can enable monitoring of a product as it passes through a batch process, a discrete process, and the like. Conventionally, such monitoring is difficult as separate schemas are utilized. Furthermore, a plurality of controllers can act as a distributed database through utilization of objects that are in accordance with the schema.

Moreover, an industrial automation device that utilizes the schema can be associated with hardware/software that facilitates transformation of data of a flat nature to data that conforms to the hierarchically structured data model. For example, the industrial automation device can be associated with one or more legacy devices which do not utilize the schema described herein. It is desirable, however, to enable legacy devices to operate within the industrial automation environment while maintaining use of the hierarchically structured data model throughout the environment. Accordingly, the industrial automation device can include templates or other suitable means for transforming received data that is structured in a flat manner to hierarchically structured data.

To the accomplishment of the foregoing and related ends, certain illustrative aspects are described herein in connection with the following description and the annexed drawings. These aspects are indicative, however, of but a few of the various ways in which the principles of the claimed subject matter can be employed, and such matter is intended to include all such aspects and their equivalents. Other advantages and novel features will become apparent from the following detailed description when considered in conjunction with the drawings.

DETAILED DESCRIPTION

Figure 1:
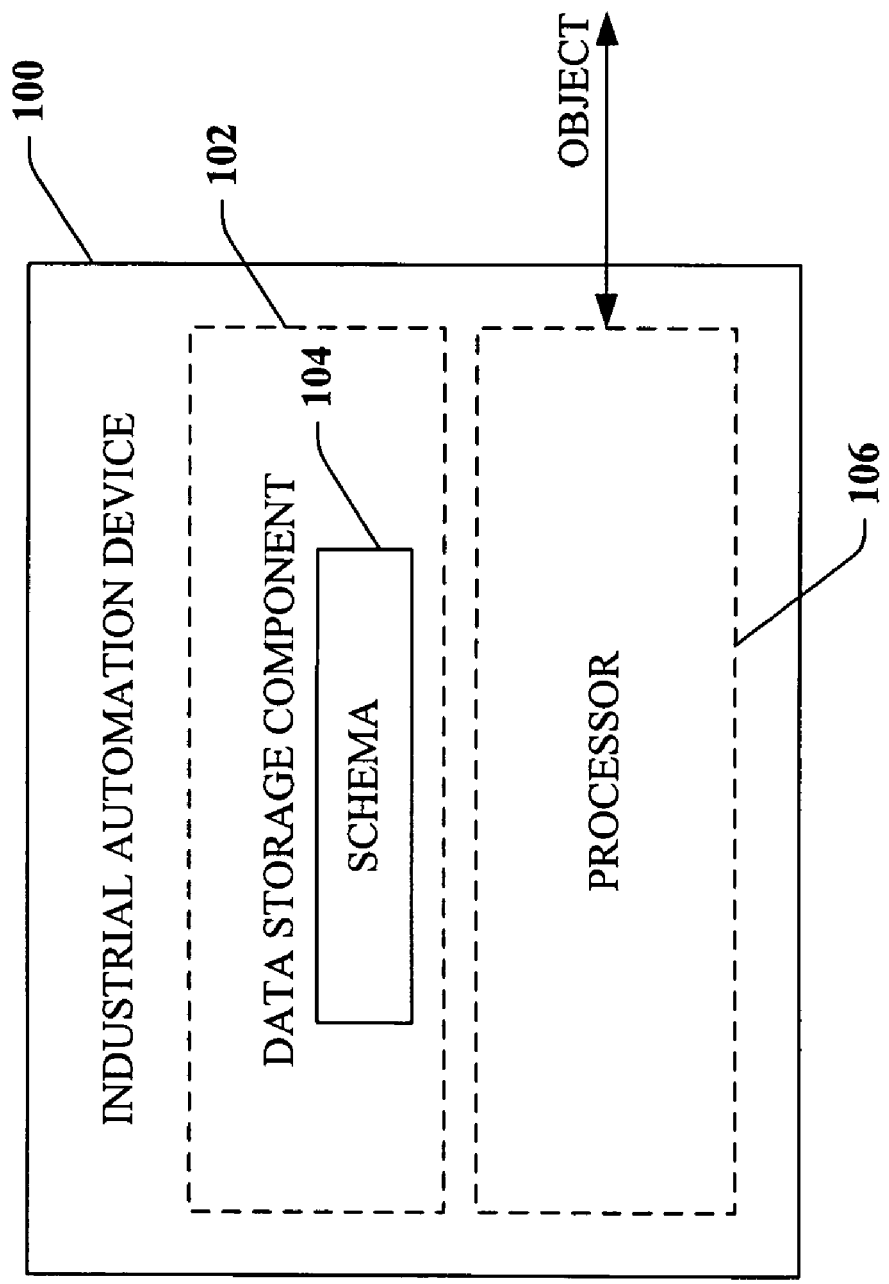
FIG. 1 is a high-level system block diagram of an industrial automation device that facilitates receipt, creation, and output of data that conforms to a hierarchically structured data model.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates an industrial automation device 100 that can be utilized in an industrial automation environment. For example, the industrial automation device 100 can be a programmable logic controller, which is a small computer often utilized for automation of real-world processes, such as control of machinery upon factory lines. Programmable logic controllers are typically microprocessor-based devices with modular and/or integral input/output that monitors status of field-connected sensors and controls actuators according to a defined logic program (e.g., conventionally written in ladder-logic). Furthermore, the industrial automation device 100 can include a programmable logic controller and software embedded therein or associated therewith. Moreover, the industrial automation device 100 can be a numeric controller, a robotic controller, a smart device, a switch, a router, a gateway, a proxy, or any other suitable entity utilized within an industrial automation environment. Accordingly, the industrial automation device 100 is meant to encompass any suitable hardware and/or software within an industrial automation environment that can be employed in connection with controlling a process.

The industrial automation device 100 can be associated with a process or product that is undertaken within an industrial environment, and can interact with disparate industrial devices (not shown) as well as higher-level systems, such as an Enterprise Resource Planning (ERP) system. ERP systems typically handle manufacturing, logistics, distribution, inventory, shipping, invoicing, and accounting for a company. The industrial automation device 100 includes a data storage component 102 that can be memory, a hard disk, a removable disk, and the like. At least a portion of a schema 104 can be included within the data storage component 102, wherein the schema facilitates implementation of a hierarchically structured data model with respect to the industrial automation device. For instance, only a portion of the schema 104 that is sufficient to enable the industrial automation device 104 to operate as desired can be included within the data storage component 102.

The schema 104 within the data storage component 102 can also be known and utilized by an ERP system associated with the industrial automation device 100, thereby enabling seamless communication between the device 100 and the ERP system. In contrast, conventional systems often require ad-hoc programming to map between low-level logic utilized in controllers with more advanced object-oriented programming languages often employed within ERP systems or Supply Chain Management (SCM) systems. The schema 102 can be designed in such a manner to enable data objects to correspond to a hierarchical arrangement of a plant. Furthermore, the schema 102 can be created to facilitate commonality and communication across process boundaries. For instance, a manufacturing process can include a batch process as well as a discrete process, where such processes operate conjunctively in connection with generating a product. Often, however, linguistics, control design, and the like vary a significant amount between the processes. Furthermore, a continuous process can be associated with the batch process and the discrete process, thereby adding further complexity to an automation system. Thus, conventionally, a substantial amount of ad-hoc programming is necessary to enable communication and control across these boundaries. Moreover, if a system is altered (e.g., devices are added or removed, a phase is altered, . . . ), interfacing across processes (e.g., batch, continuous, discrete) will also require updating by a programming specialist. Often, one aspect of a process (e.g., a batch, discrete, or continuous portion of a process) will be updated less frequently than another, thereby causing greater difficulty in managing such process. To even further difficulties associated with maintaining a robust control system, disparate software vendors can provide software tools that do not integrate easily.

The schema 104 can be designed in a manner to mitigate several of the aforementioned deficiencies associated with conventional controllers and control systems. In particular, the schema 104 can be modeled to facilitate implementation of a hierarchically structured data model that can represent a hierarchical nature of a plant. This in turn enables a plant to be modeled across system and/or process bounds. In more detail, the schema 104 can facilitate implementation of a data model that is substantially similar with respect to a batch process, a continuous process, a discrete process, and inventory tracking. One exemplary hierarchy that can be employed in connection with the schema 104 is provided in greater detail herein. In one example, the schema 104 can be modeled in accordance with ISA S88, ISA S95, OMAC, or any suitable combination thereof. ISA S88, in particular, is a standard that has been utilized in batch industries. The standard, however, can be extended and/or modified to correspond to other processing areas (continuous, discrete, ... ).

As alluded to above, the data storage component 102 can include sufficient storage space to retain at least a portion of the schema 104. Placing the schema 104 within the automation device 100 (rather than solely utilizing the schema 104 within an ERP system) provides a greater probability of universal adoption of the schema 104 as well as various other advantages. For instance, placing the schema 104 within the automation device 100 enables devices to be added and/or removed from I/O ports of the device 100 and a control system to be automatically updated upon detection of the addition and/or subtraction of devices with respect to one or more ports. In other words, plug-and-play functionality is enabled through utilization of the schema 104 within the automation device 100. In contrast, if the schema 104 were not implemented within a device, then each instance of alteration of hardware would require manually updating configuration of a control system (by an IT professional). This again can cause inconsistencies across system/process boundaries, as some portions of a control system may be updated in more expediently than others.

Furthermore, data can be retrieved from one or more controllers to dynamically create user interfaces with respect to a control process. For example, data objects that conform to the schema 104 can relate to low-level drives, motors, and the like, and exist within the industrial automation device 100. These objects can be analyzed and utilized to dynamically update a user interface. For instance, an object within the industrial automation device 100 can relate to a motor, and can be state-driven (e.g., can track states of the motor, such as hold, abort, ... ). In other words, the data object can include and/or be associated with a state machine, and such state machine can be analyzed to determine data that can be displayed. Thus, the motor can be dynamically provided as well as a state of the motor. As described above, the schema 104 can be designed to correspond to a plant hierarchy—thus any data objects within the plant hierarchy can be utilized to dynamically generate views. For example, a "control module" object can be a child of an "equipment module" object, and the "equipment module" object can be a child of a "phase" object. Thus, a process phase represented by a "phase object" can analyze states associated with the child objects, and a user interface illustrating the phase can be dynamically generated.

With more detail regarding the hierarchically structured data model, such model can be based at least in part upon ISA S88, ISA S95, OMAC, and/or any suitable combination thereof. The industrial automation device 100 can include a processor 106 that can be utilized to receive, execute, and/or create data objects that conform to the hierarchically structured data model. Thus, data associated with the hierarchically structured data model can be representative of particular devices, portions of device, processes, portions of processes, and the like. The industrial automation device 100, which can be utilized to control devices/processes, includes at least a portion of the schema 104 that enables such device 100 to recognize and output data that is structured in accordance with the hierarchically structured data model. The industrial automation device 100, through utilization of this data model, can interact with other devices (e.g., controllers) as well as higher-level systems, such as an Enterprise Resource Planning (ERP) system. ERP systems typically handle manufacturing, logistics, distribution, inventory, shipping, invoicing, and accounting for a company. The schema referenced above can also be employed by an ERP system associated with the programmable logic controller, thereby enabling seamless communication between the industrial automation device 100 and ERP systems. Conventional systems, in contrast, often require ad-hoc programming to map between low-level logic utilized in controllers with more advanced object-oriented programming languages often employed within ERP systems. Another common use would be to interact with a Supply Chain Management system (SCM).

The hierarchically structured data model can be designed in such a manner to enable data received, executed, and/or output by the processor 106 to correspond to a hierarchical arrangement of devices and/or a hierarchical arrangement of processes that occur within the plant. Furthermore, the hierarchically structured data model can be designed in a manner that enables modeling of a plant across system and/or process boundaries. The hierarchically structured data model can be implemented so that a substantially similar structure is provided with respect to a batch process, a continuous process, a discrete process, and inventory tracking.

Figure 2:
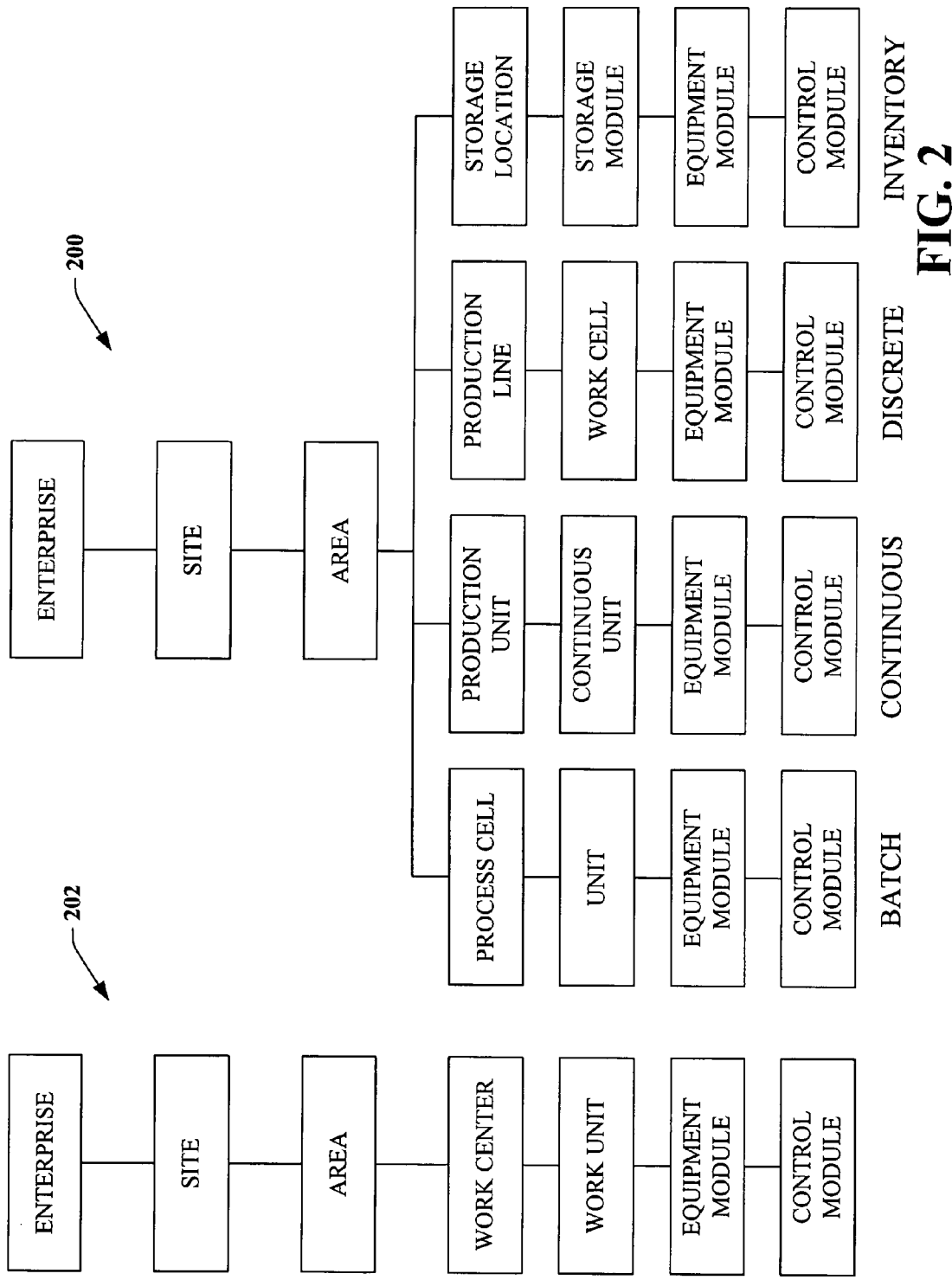
FIG. 2 illustrates exemplary hierarchies that can be utilized in connection with the hierarchically structured data model.

Now turning to FIG. 2, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 200 illustrates a representation of equipment within a plant given disparate processes. For instance, a hierarchy in accordance with a batch process can include a representation of an enterprise, site, area, process cell, unit, equipment module, and control module. In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 202 can be utilized that represents each of the aforementioned hierarchical representations. The hierarchy 202 can include representations of an enterprise, a site, an area, a work center, a work unit, an equipment module, and a control module. Thus, a common representation can be generated that adequately represents the hierarchy 200. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 200). Metadata can be employed to enable display of such data in accordance with known, conventional usage of such data. Thus, implementation of a schema in accordance with the hierarchy 202 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations and derivatives of utilizing the hierarchy 202 (or similar hierarchy) within a controller.

Figure 3:
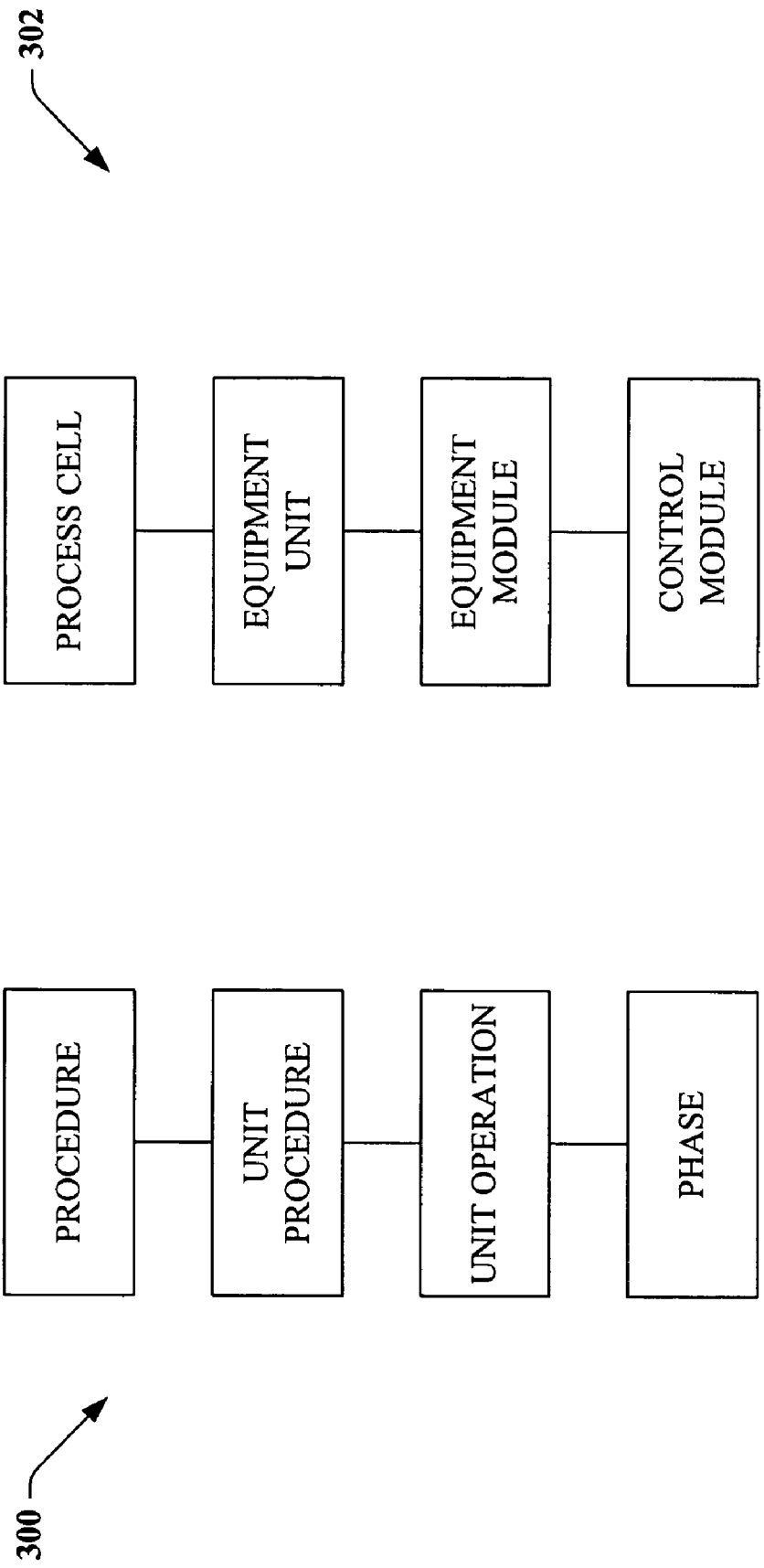
FIG. 3 illustrates exemplary hierarchies that can be utilized in connection with the hierarchically structured data model.

Now referring to FIG. 3, standard hierarchies that can be utilized to represent procedures and equipment are illustrated. In particular, a hierarchy 300 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, and pausing a motor, opening and closing a valve, and the like. A hierarchy 302 relating to a representation of equipment in, for example, a batch process is displayed adjacent to the hierarchy 300. The representations within the hierarchy 302 were described in greater detail with respect to FIG. 2.

Figure 4:
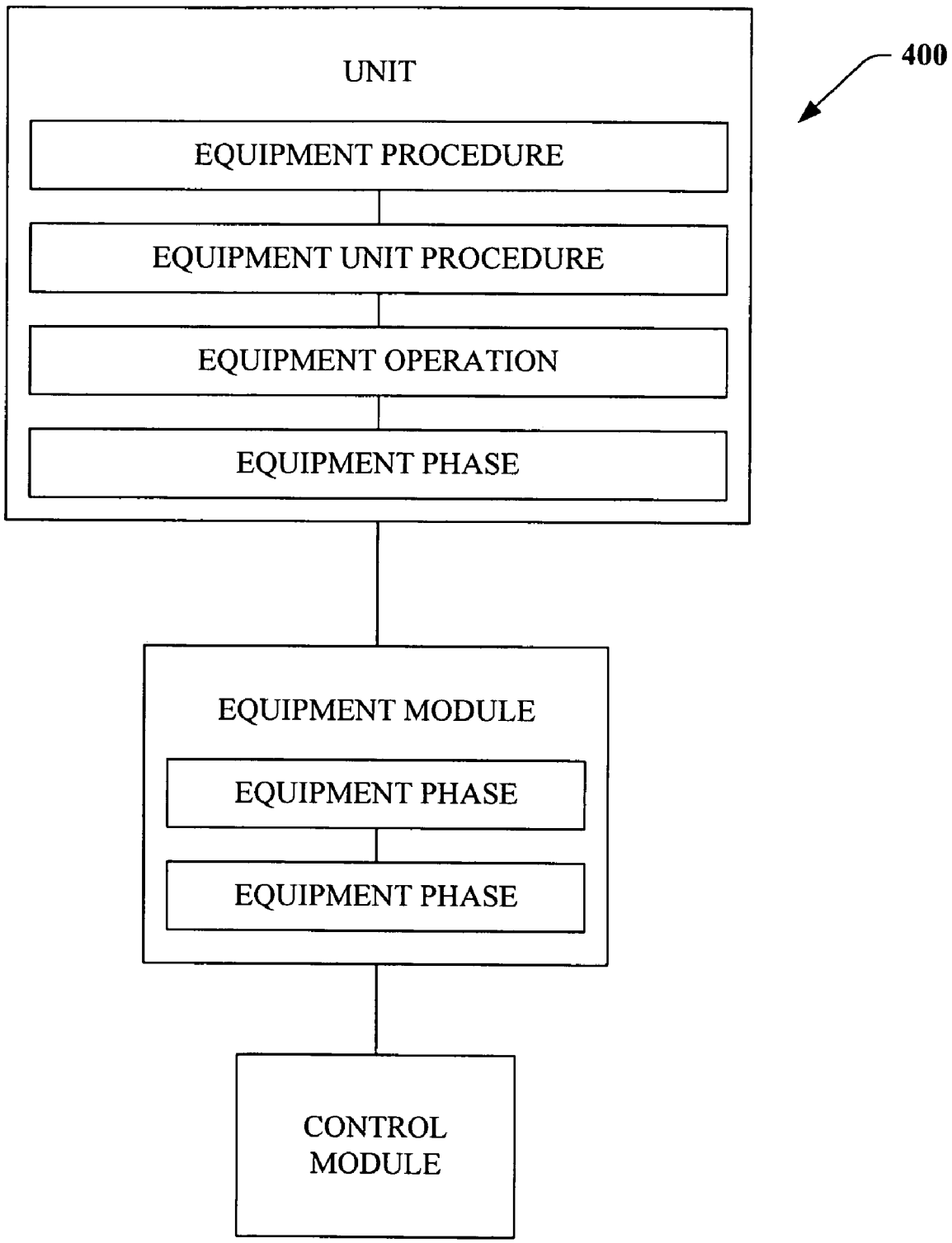
FIG. 4 illustrates an exemplary combination of hierarchies.
Figure 5:
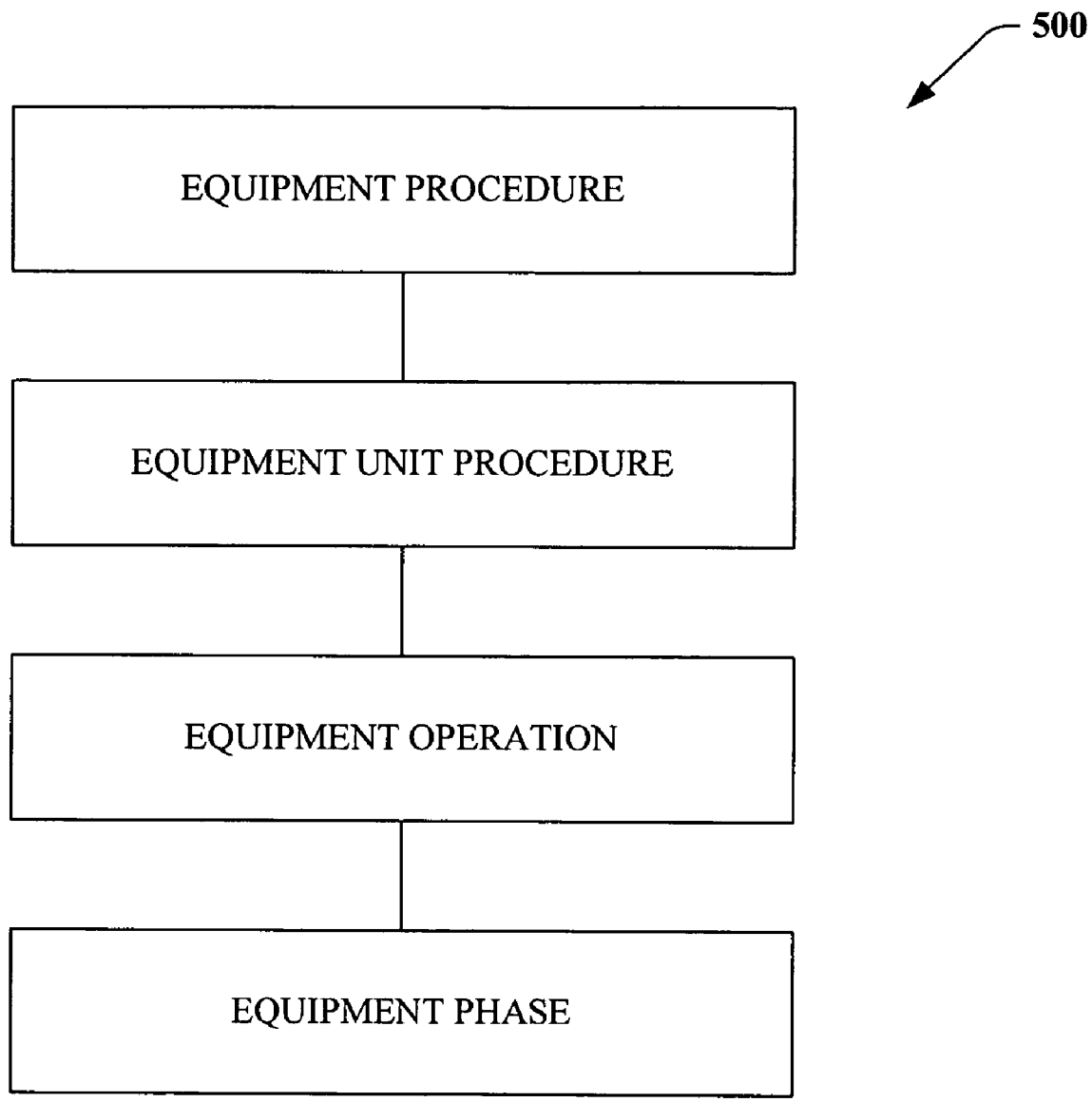
FIG. 5 illustrates an exemplary combination of hierarchies.

Now turning to FIG. 4, a hierarchy 400 that represents one possible integration of the hierarchies 300 and 302 (FIG. 3) is illustrated. A unit (such as a work unit described in FIG. 2) can be associated with an equipment procedure, an equipment unit procedure, an equipment operation, and an equipment phase. Thus, the procedures, operation, and phase can be associated with a particular work unit. An equipment module can be associated with one or more equipment phases, and can be above a control module in the hierarchy. Referring briefly to FIG. 5, a hierarchy 500 that can be utilized in connection with equipment control is illustrated. The hierarchy is substantially similar to that described within the unit portion of the equipment unit. As stated above, the hierarchies illustrated in FIGS. 2-5 can be based upon a standard, such as ISA S88, ISA S95, OMAC, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 3-5 can be existent within an industrial device (e.g., a controller), together with state machines that enable creation of such objects.

Figure 6:
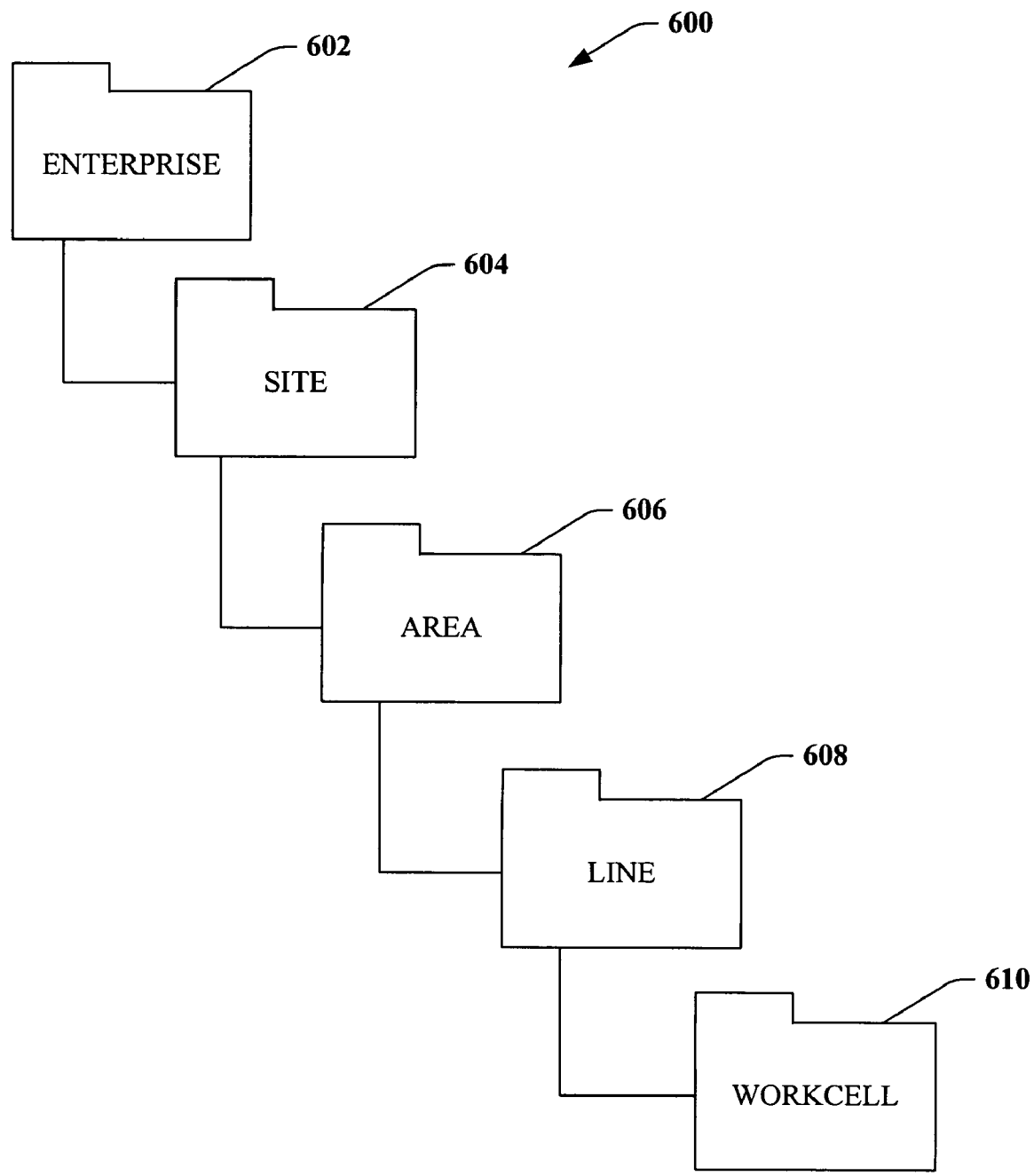
FIG. 6 is a visual representation of an exemplary structure upon which the hierarchically structured data model can be based.

Referring now to FIG. 6, an exemplary hierarchical structure 600 which can be utilized in connection with the hierarchically structured data model described herein is illustrated. For example, the data model can facilitate nested structures, thereby mitigating deficiencies associated with data models that employ flat namespaces. The structure 600 includes an enterprise level 602, where a particular enterprise can be represented within data structured in accordance with a hierarchical data model. Beneath the enterprise level 602 level can be a site level 604, so that a particular factory (site) within an enterprise can be represented within a data packet. Beneath the site level 604 an area level 606 can exist, which specifies an area within the factory that relates to the data. A line level 608 can lie beneath the area level 606, wherein the line level 608 is indicative of a line associated with particular data. Beneath the line level 608 a workcell level 610 can exist, thereby indicating a workcell associated with the data. Utilizing a nested, hierarchical data model, PLCs can become more aware of data associated therewith. Furthermore, the hierarchy 600 can be customized by an owner of such hierarchy. For instance, more granular objects/levels can be defined within the hierarchy 600.

Figure 7:
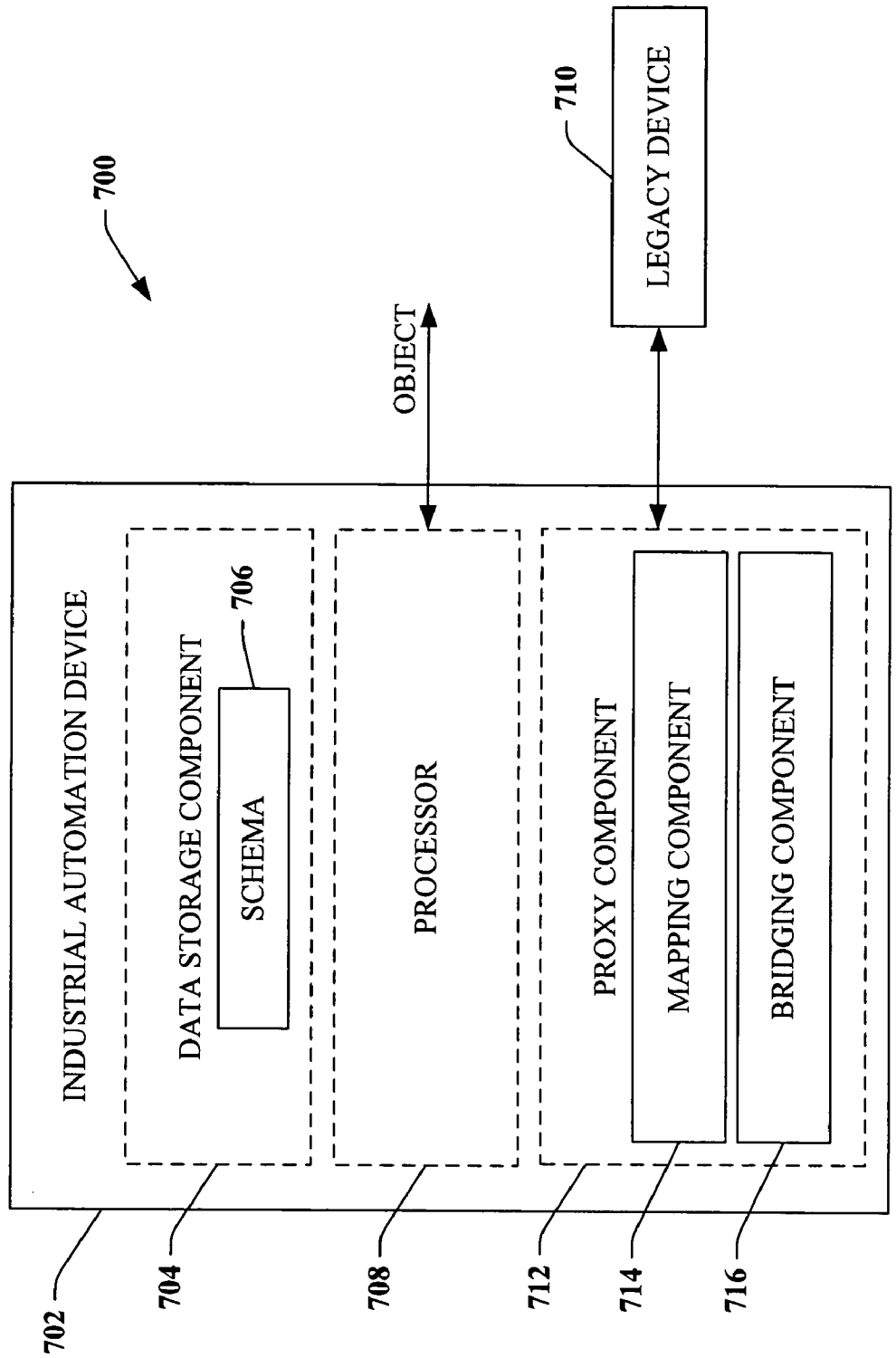
FIG. 7 is a system block diagram depicting an industrial automation device that can receive, create, and output data that conforms to a hierarchically structured data model receiving and implementing data from a legacy automation device.

Now turning to FIG. 7, a system 700 that facilitates utilization of a legacy device within an industrial automation environment is illustrated. The system 700 includes an industrial automation device 702 that comprises a data storage component 704. Within the data storage component 704 exists at least a portion of a schema 706 that facilitates implementation of a hierarchically structured data model within an industrial automation environment. Various possible implementations and/or results of the schema 706 have been described above. The industrial automation device 702 can further include a processor 708 that can receive, execute, and/or create data objects that conform to the hierarchically structured data model. For instance, the processor can receive and implement a control module (which can be referred to as a control program for low-level devices), an equipment module (which can be referred to as a collection of control modules), a unit procedure, or the like. These disparate objects can be instantiated through utilization of the schema 706.

The system 700 can further include a legacy device 710 that desirably communicates to the industrial automation device 702. However, the legacy device 710 can lack capabilities to implement the schema 706 and/or be designed to output data in a data model that is disparate than the data model that is implemented through the schema 706. Accordingly, a proxy component 712 is provided, where the proxy component 712 facilitates mapping data from the legacy device 710 to data that conforms to the hierarchically structured data model. In more detail, the proxy component 712 can include a bridging component 714 that operates as a bridge between disparate networks. For example, the legacy device 710 may be adapted to send/receive data over a first network protocol, such as ProfiBus, ModBus, ASIbus, FieldBus, Foundation FieldBus, Hart, or the like, while the industrial automation device 700 may wish to receive data packaged in conformance with a disparate network protocol, such as the Common Industrial Protocol (CIP). The bridging component 714 can recognize that data from the legacy device 710 is packaged in accordance with the first network protocol and thereafter re-package such data so that it conforms to the second network protocol. The bridging component 714 can be associated with a mapping component 716 that can reformat the data so that it is in accordance with the hierarchically structured data model. For instance, the mapping component 716 can access templates associated with the schema 706 and utilize such templates to map the data to the hierarchically structured data model.

Figure 8:
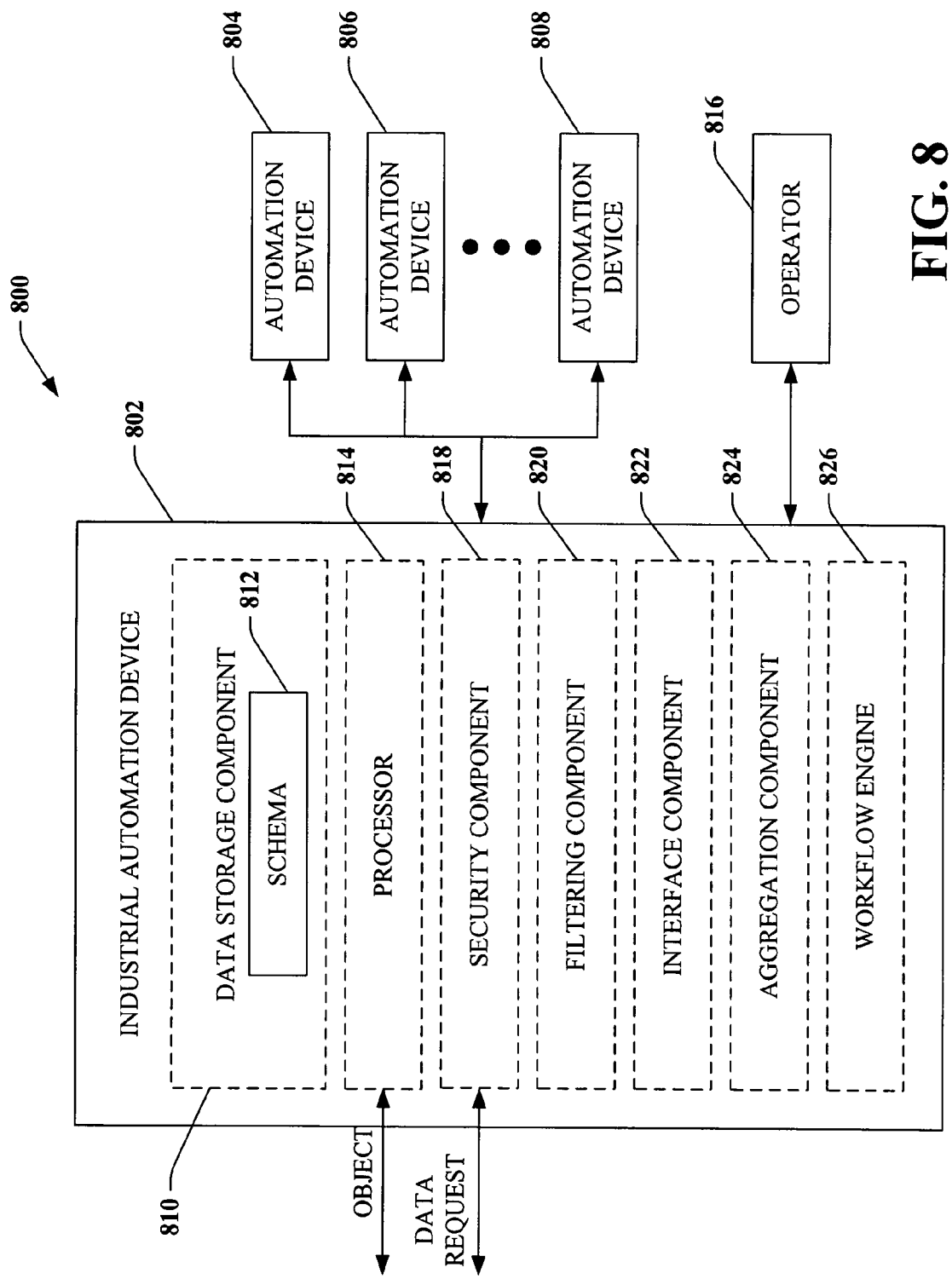
FIG. 8 illustrates a system that facilitates execution of a workflow by an industrial automation device, such as a controller.

Turning now to FIG. 8, a system 800 that facilitates implementation of a hierarchically structured data model within an industrial automation environment is illustrated. The system 800 includes an industrial automation device 802 that is utilized to control one or more industrial processes or industrial devices. Furthermore, the industrial automation device 802 can be communicatively coupled to a plurality of automation devices 804-808, such as controllers, network switches, or any other suitable devices that can be utilized in an industrial environment. These devices 802-808 can work in concert to control a process, act as a distributed database, etc. The industrial automation device 802 includes a data storage component 810, wherein the data storage component houses at least a portion of a schema 812 that facilitates instantiation of objects that conform to a hierarchically structured data model. A processor 814 is communicatively coupled to the data storage component 810 and can receive, execute, and/or create objects that conform to the hierarchically structured data model (that is enabled through utilization of the schema 812).

The system 800 further includes an operator 816 that requests access to data associated with the industrial automation device. In another example, one or more of the automation devices 804-808 can request access to data associated with the industrial automation device 802. Prior to providing the operator 816 and/or the automation devices 804-808 with access to data associated with the device 802, however, a security component 818 can be employed to ensure that an entity (user) requesting access is authorized access to requested data. The security component 818 can request identifying data from an entity requesting access to data associated with the device 802, such as username, password, personal identification number, digitized biometric indicia, or any other suitable data. The security component 818 can then analyze the provided data and determine whether the requesting entity is authorized to review the requested data. For instance, the security component 818 can review a table that includes identities of entities and authorization levels associated therewith. In another example, a user or entity may wish to enter data into the industrial automation device 802, and the security component 818 can ensure that 1) there is physical space available for the data desirably input and 2) the entity is authorized to input the data. Thus, the security component 818 can monitor physical device parameters as well as user/entity related parameters to ensure proper addition of data to the industrial automation device 802. Furthermore, the security component 818 can consider an entity/user's context, such as entity/user's role (operator, technician, electrician, . . . ), an entity/user's scenario (routine maintenance, plant diagnostics, . . . ), and such context can be input to the security component 818 and employed to manage access to the industrial automation device 802. Further, the security component 818 can account for configuration of the industrial automation device 802 as well as connected devices. Moreover, prior to providing access to all data associated with the industrial automation device 802, a filtering component 820 can requested data based at least in part upon entity identity, entity location, entity role, or any other suitable parameter associated with an entity (e.g., an automation device or the operator 816). For instance, the filtering component 820 can prohibit particular individuals/entities from receiving data with which they have no association (e.g., an accountant need not receive control data associated with a factory process).

The industrial automation device 802 can further include an interface component 822 that facilitates communications between the operator 816 and the industrial automation device and/or between at least one of the automation devices 804-808 and the industrial automation device 802. In more detail, the interface component 822 can be utilized to relay data that conforms to the hierarchically structured data model instantiated by the schema 812 over the Internet 616 or an intranet between the industrial automation device 802 and the automation devices 804-808 and/or the operator 816. For example, one need not be proximate to a workcell or line to receive data associated with the industrial automation device 802. In contrast, an executive located in a hotel at a remote distance from the industrial automation device 802 can receive data associated with the industrial automation device 802 by way of the Internet. For instance, the interface component 822 can include hardware (such as ports, cabling, and the like) as well as software (e.g., software supporting a protocol stack associated with the Internet). The industrial automation device 802 can further include an aggregation component 824 that facilitates aggregation of data associated with the automation devices 804-808. For example, the industrial automation device 802 can be employed to control a process by way of the automation devices 804-808. Therefore, it is imperative that the industrial automation device 802 have ability to aggregate data from different data sources. The processor 814 can then be employed to generate control commands based at least in part upon the aggregated data. The industrial automation device 802 can further include a workflow engine 826 that facilitates execution of a workflow at the industrial automation device. Workflows can define how tasks are structured, who performs them, what their relative order is, how they are synchronized, how information flows to support the tasks and how tasks are being tracked. An exemplary workflow can cause the first automation device 804 to perform a particular function, the third automation device 808 to perform a specific function upon completion of the function performed by the first automation device, etc. In one particular example, the workflow engine 826 can execute a workflow based at least in part upon utilization of the schema 812. This enables complex commands to be generated by the processor 814 and output to the automation devices 804-808. For instance, the workflow engine 826 can execute a workflow written in Business Process Execution Language (BPEL) or through any other suitable language.

Figure 9:
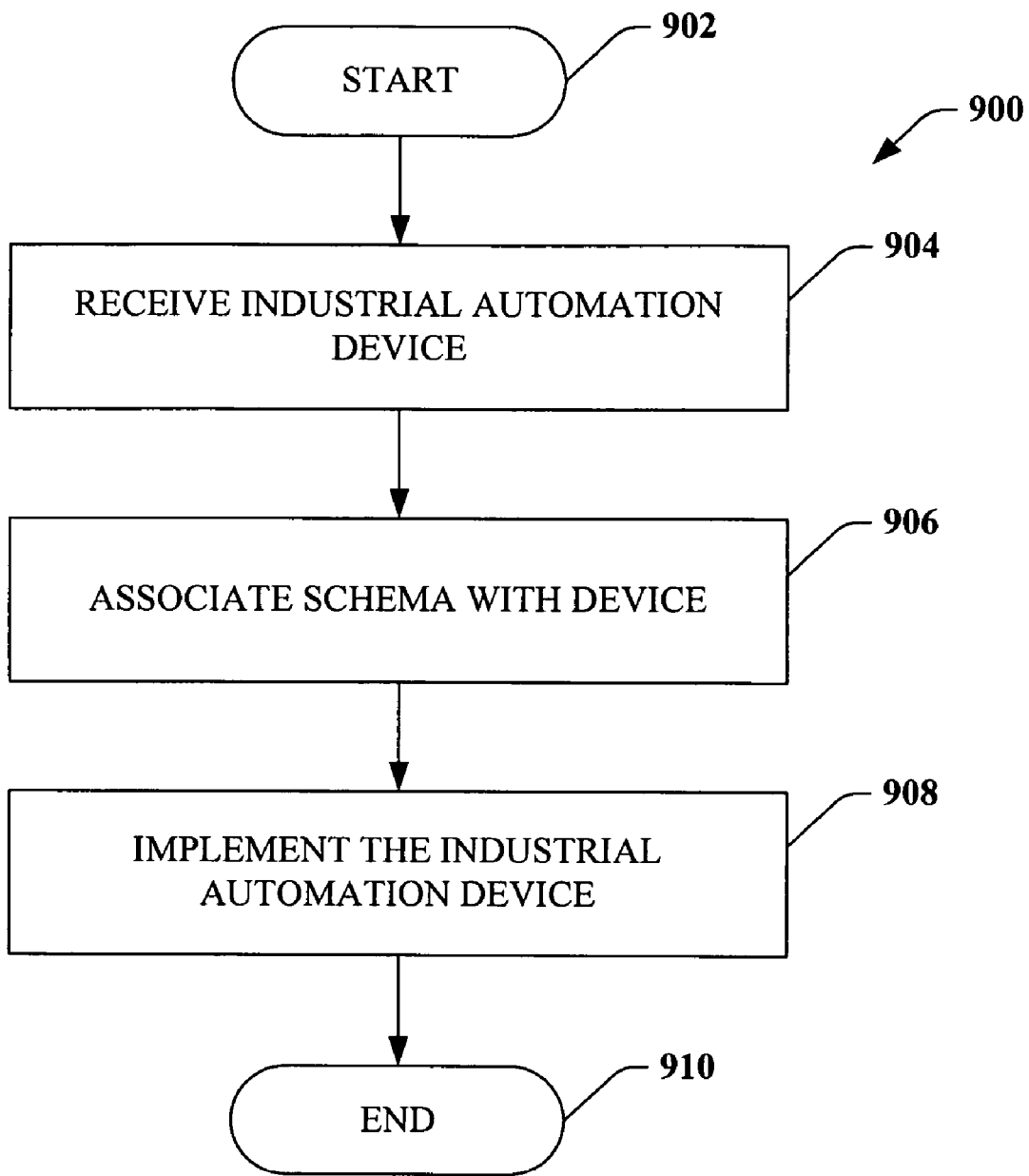
FIG. 9 illustrates a representative flow diagram of a methodology for implementing a hierarchically structured data model within an industrial automation environment.
Figure 10:
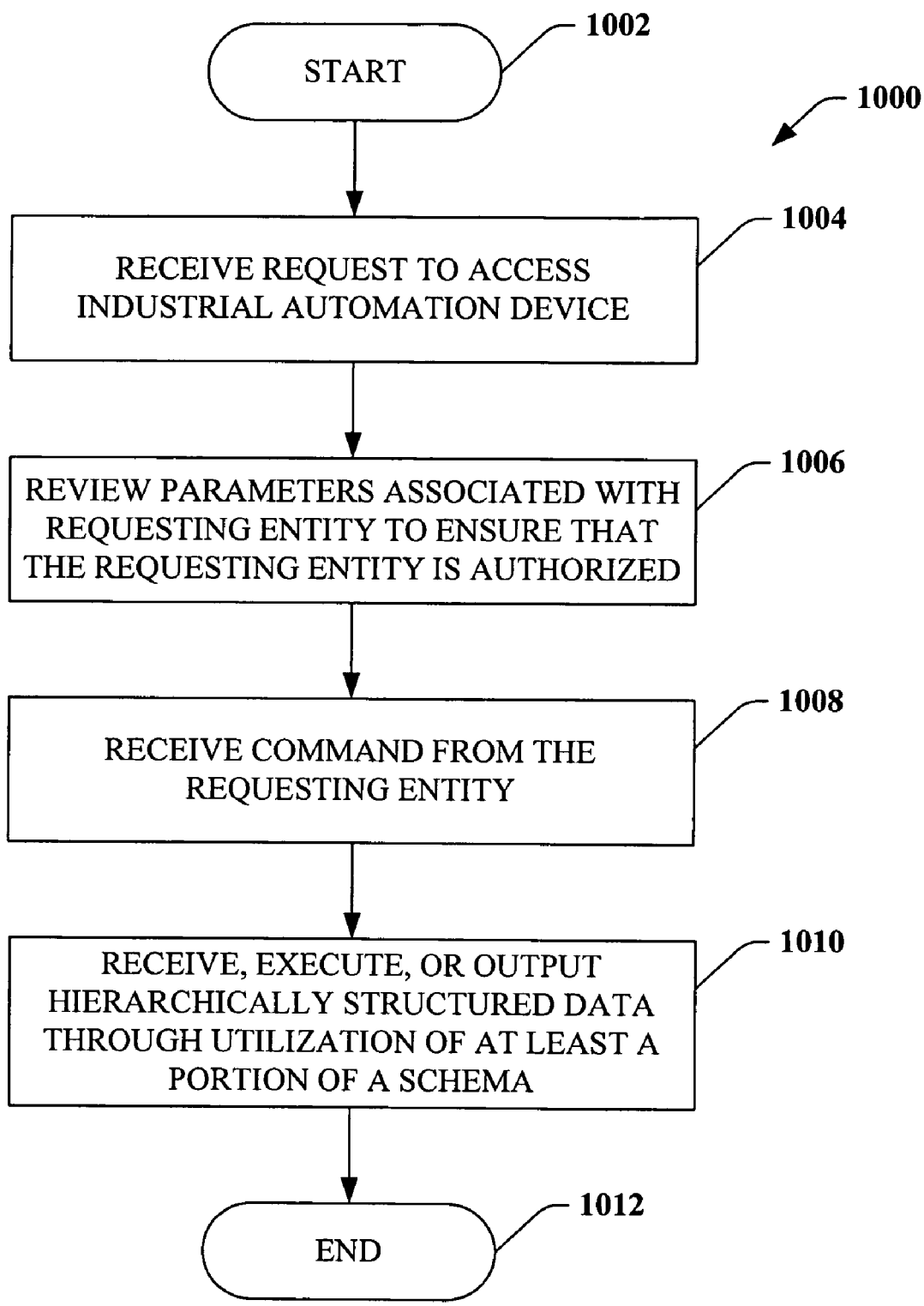
FIG. 10 is a representative flow diagram for ensuring that an entity is authorized to access data associated with an industrial automation device.
Figure 11:
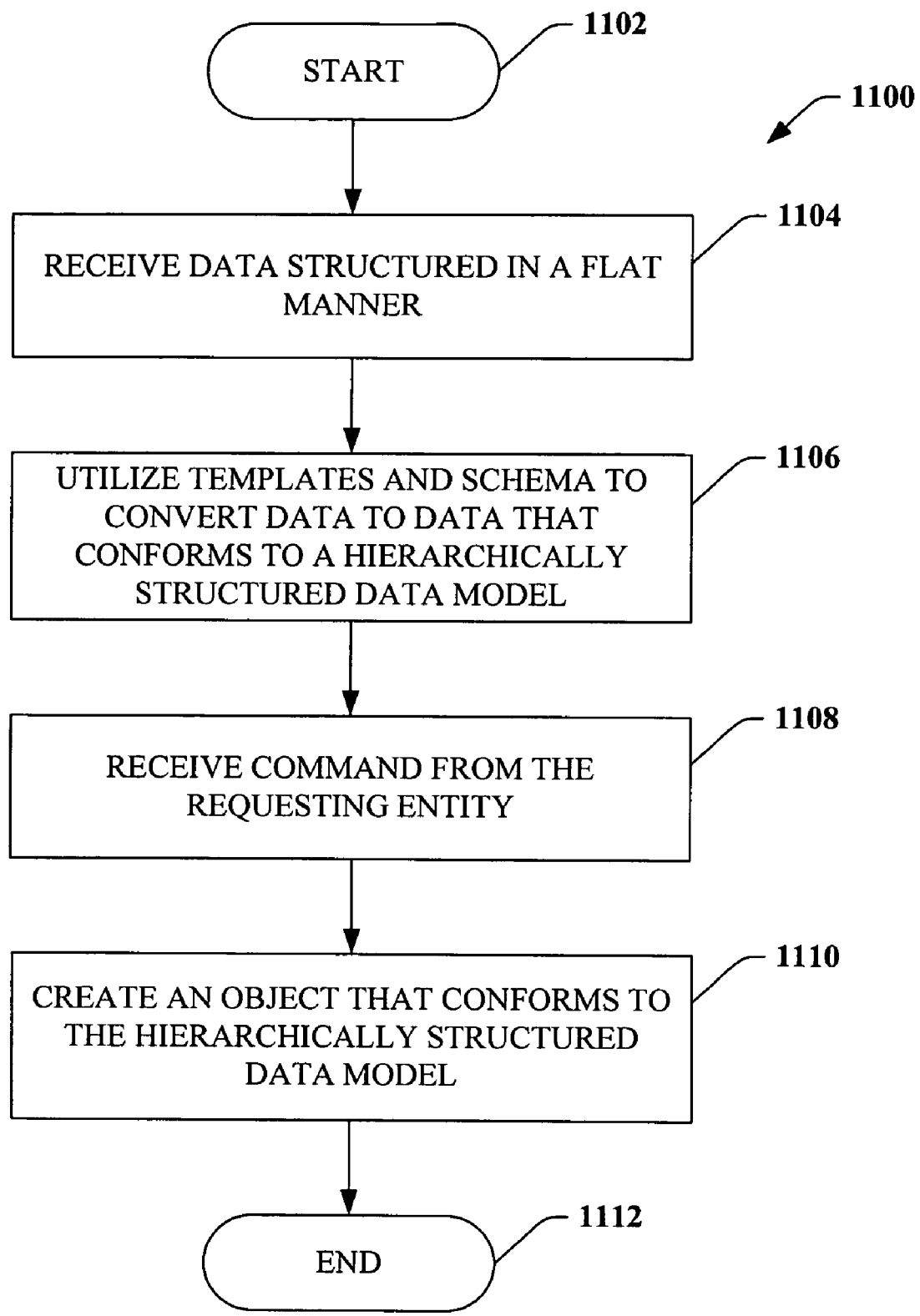
FIG. 11 is a representative flow diagram illustration creation of a data object that conforms to a hierarchically structured data model.

Referring to FIGS. 9-11, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 9, a methodology 900 for implementing a hierarchically structured data model within an industrial environment is illustrated. The methodology 900 beings at 902, and at 904 an industrial automation device is received. For example, the industrial automation device can be a controller, such as a programmable logic controller, a numeric controller, a robotic controller, and the like. Furthermore, the industrial automation device can be a smart device, a network switch, a network router, a gateway, a proxy server, or any other suitable device. At 906, a schema is associated with the device. As described above, the schema can facilitate implementation of a hierarchically structured data model, wherein data that conforms to such model can be received, executed, and output by the industrial automation device. In one example, the industrial automation device can be designed to incorporate at least a portion of the schema (e.g., at least a portion of the schema can be retained in storage space associated with the industrial automation device). At 908, the industrial automation device can be implemented, wherein the implementation facilitates permeation of a common, hierarchically structured data model throughout an industrial environment. The methodology 900 completes at 910.

Now referring to FIG. 10, a methodology 1000 for implementing a common data model throughout an industrial automation environment is illustrated. The methodology 1000 begins at 1002, and at 1004 a request is received to access an industrial automation device. For example, the request can be initiated by an operator or another industrial device. At 1006, parameters associated with the requesting entity are reviewed to ensure that the requesting entity is authorized to implement the request. For example, the request can be initiated by an operator and relate to provision of a user interface that includes particular data associated with the industrial automation device. In another example, a controller can request access to the device to review/utilize particular data associated with the device. To ensure that the requesting entity is authorized to access the industrial automation device, user identity, user role, MAC address, time of data, day of week, process parameters, and the like can be analyzed. For instance, a particular user may not be authorized to access the industrial automation device at particular times. At 1010, hierarchically structured data is received, executed, or output based at least in part upon the commands and through utilization of a schema that facilitates implementation of the hierarchically structured data model. For example, if the command was a request for data, then data that conforms to a hierarchically structured data model can be output to the requesting entity. The methodology 1000 completes at 1012.

Now referring to FIG. 11, a methodology 1100 for implementing a hierarchically structured data model throughout an industrial automation environment is illustrated. The methodology 1100 begins at 1102, and at 1104 data structured in a flat manner is received. For example, the data can be received from an industrial automation device that is a legacy device and does not or cannot support a schema that facilitates implementation of the hierarchically structured data model. At 1106, templates and the schema are utilized to convert the data structured in a flat manner to data structured in accordance with the hierarchically structured data model. At 1108, a command from a requesting entity is received, and at 1110 an object conforming to the hierarchically structured data model is created. The methodology 1100 then completes at 1112.

Figure 12:
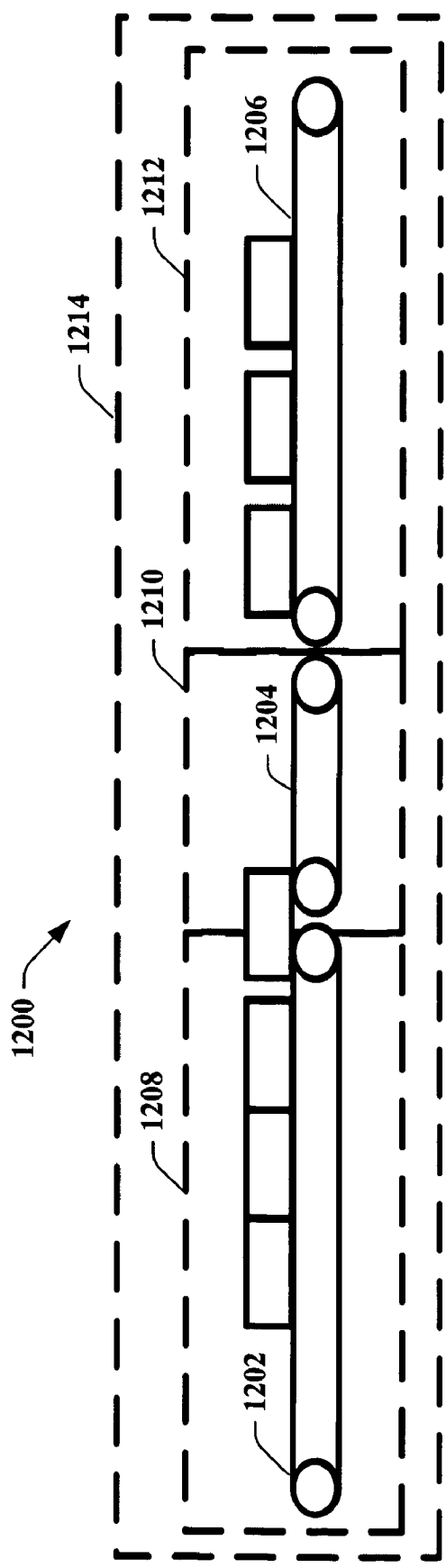
FIG. 12 illustrates a conveyor system that includes equipment modules and control modules.

Now referring to FIG. 12, a system 1200 that illustrates exemplary equipment modules and exemplary control modules within a conveyor application is illustrated. The conveyor application includes an in-feed conveyor 1202 that provides items to a gap conveyor 1204 (which generates gaps of appropriate sizes), which in turn provides gaps to an out-feed conveyor 1206. As stated previously, control modules can be defined as low-level motors, valves, and the like and corresponding control logic. Thus, a control module can be a motor that is employed to rotate conveyor belts and control logic associated therewith. Accordingly, the system 1200 can include six control modules (six motors and control logic associated therewith). Equipment modules 1208-1212 can be defined in accordance with the conveyors 1202-1206. More specifically, the equipment module 1208 can relate to the in-feed conveyor 1202, the equipment module 1210 can relate to the gap conveyor 1204, and the equipment module 1212 can relate to the out-feed conveyor 1206. Moreover, an equipment module 1214 can be defined that includes the equipment modules 1208-1212. A user interface can illustrate the equipment modules and control modules in a hierarchical manner and provide a manner in which to modify the equipment modules 1208-1214 and/or the control modules therein. For example, a controller can include data objects, interfaces, state machines, and the like that can be modified by a user to edit a control process including such entities.

Figure 13:
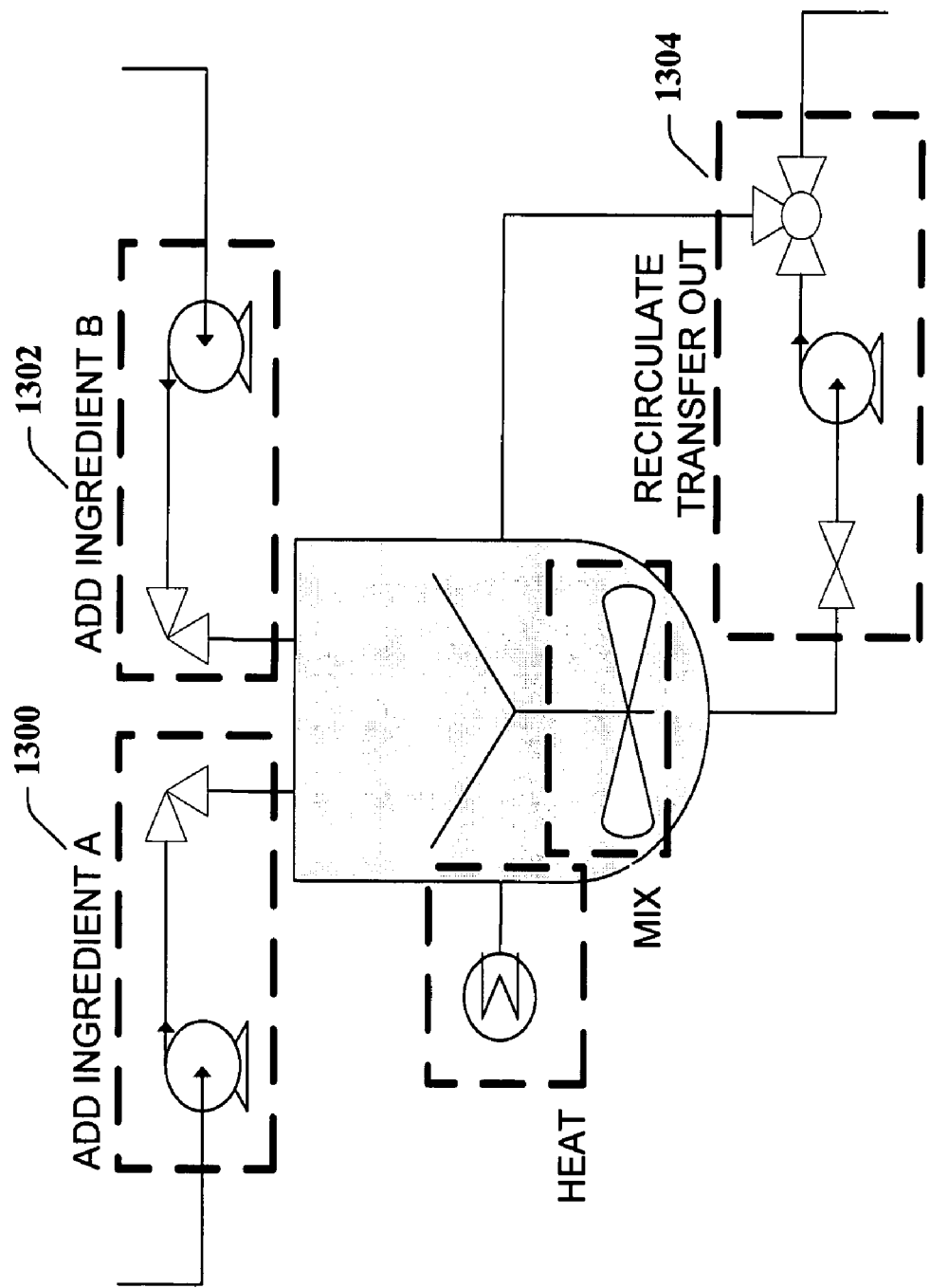
FIG. 13 illustrates a mixing system that includes equipment phases, equipment modules, and control modules.

Referring now to FIG. 13, examples of equipment phases within a mixer application is illustrated. More specifically, an equipment phase represents capabilities of an equipment module (a collection of control modules). For instance, an in-feed can be utilized to add an ingredient to a mixer. Therefore, add ingredient A 1300 and add ingredient B 1302 are equipment phases. The in-feed itself can be an equipment module, and it is understood that an equipment phase can support one or more equipment modules. An out-feed can be an equipment module, and recirculate and transfer out 1304 can be equipment phases (e.g., the out-feed equipment module can be supported by two equipment phases). With greater specificity with regard to equipment phases, for example, equipment phases can be defined as mutually exclusive and/or mutually inclusive. As described above, data objects corresponding to equipment phases can be placed directly within an industrial automation device, rather than being programmed at an MES layer and thereafter mapped to such device.

Figure 14:
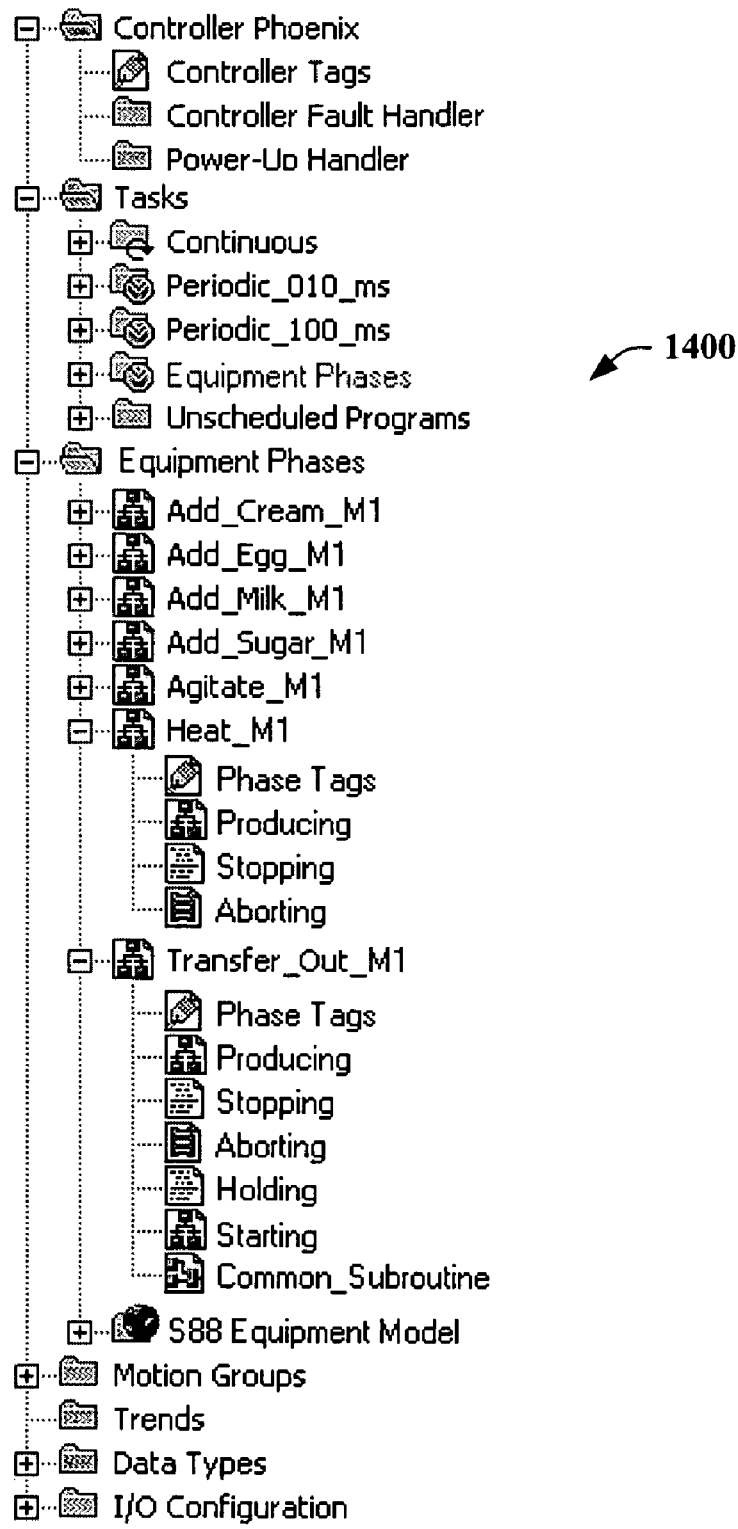
FIG. 14 is a screenshot illustrating an interface that depicts one exemplary hierarchical structure that can be employed.
Figure 15:
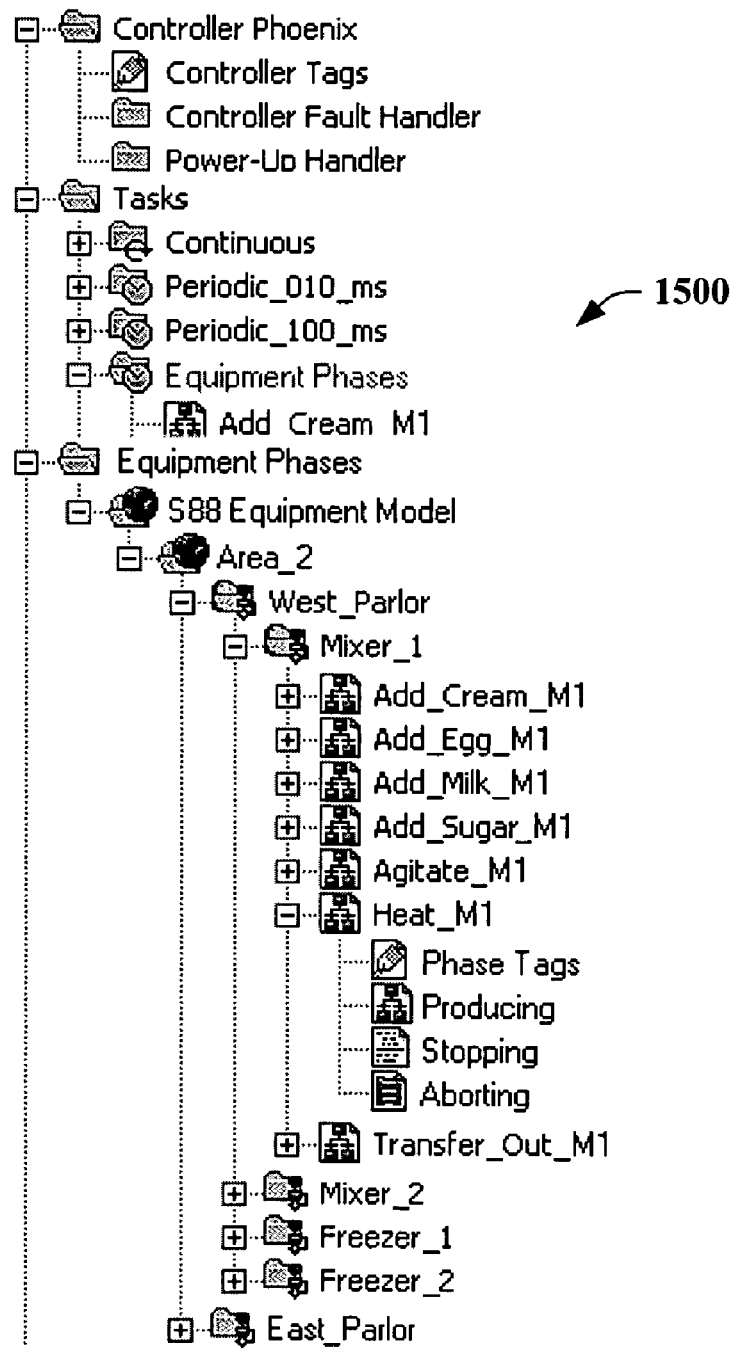
FIG. 15 is a screenshot illustrating an interface that depicts another exemplary hierarchical structure that can be employed.

Referring to FIGS. 14 and 15, exemplary hierarchies 1400 and 1500 are illustrated. For instance, folders can be expanded or contracted to review disparate states, phases, equipment modules, and the like. If desired, an equipment phase, unit procedure, and the like can be edited and/or implemented from hierarchies such as those shown in the provided figures. Thus, these hierarchies 1400 and 1500 can be utilized by an operator to traverse through folders and quickly reach a desired system, device, process, or sub-process utilized within a factory.

Figure 16:
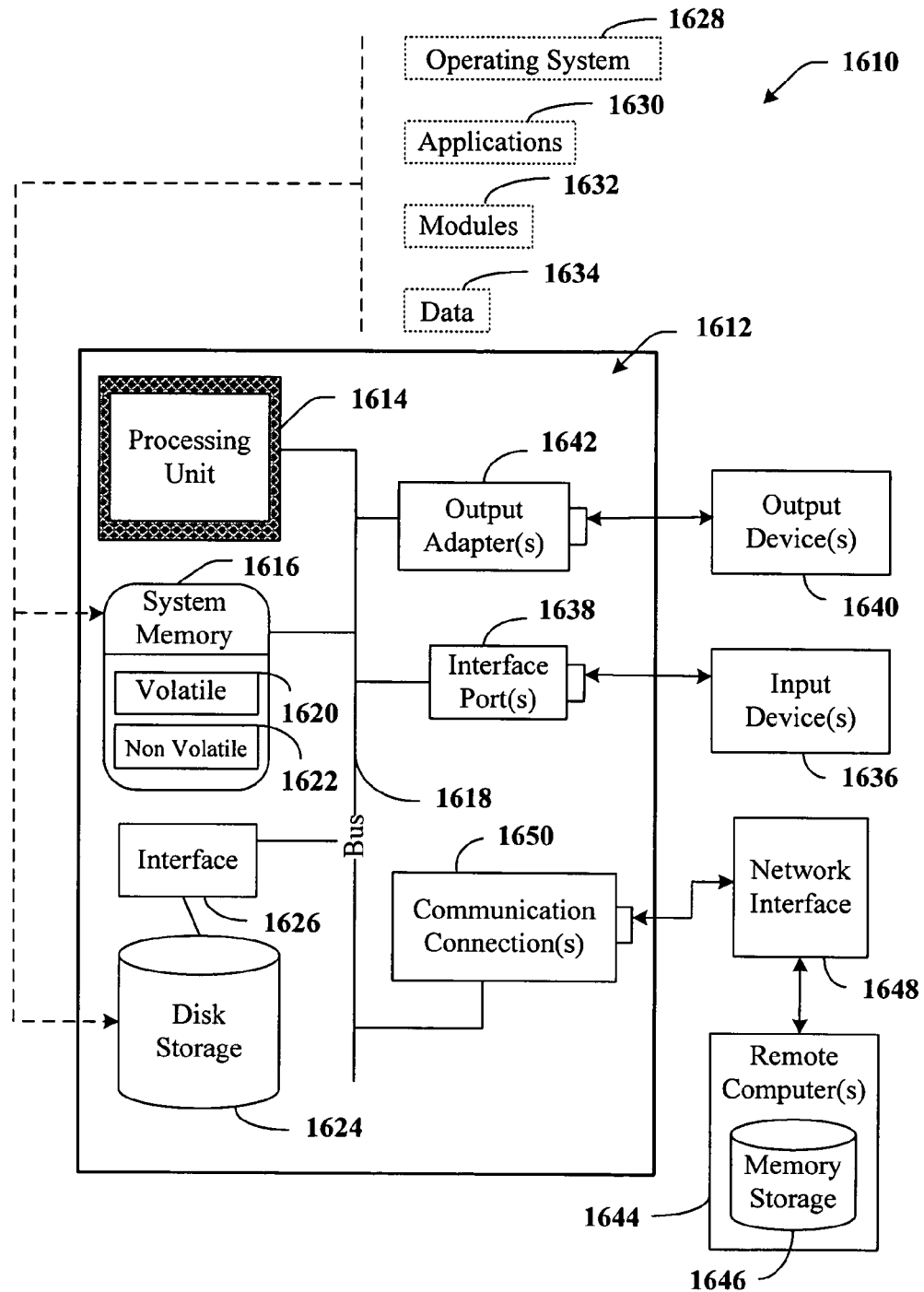
FIG. 16 is an example operating system upon which various features described herein can be implemented.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
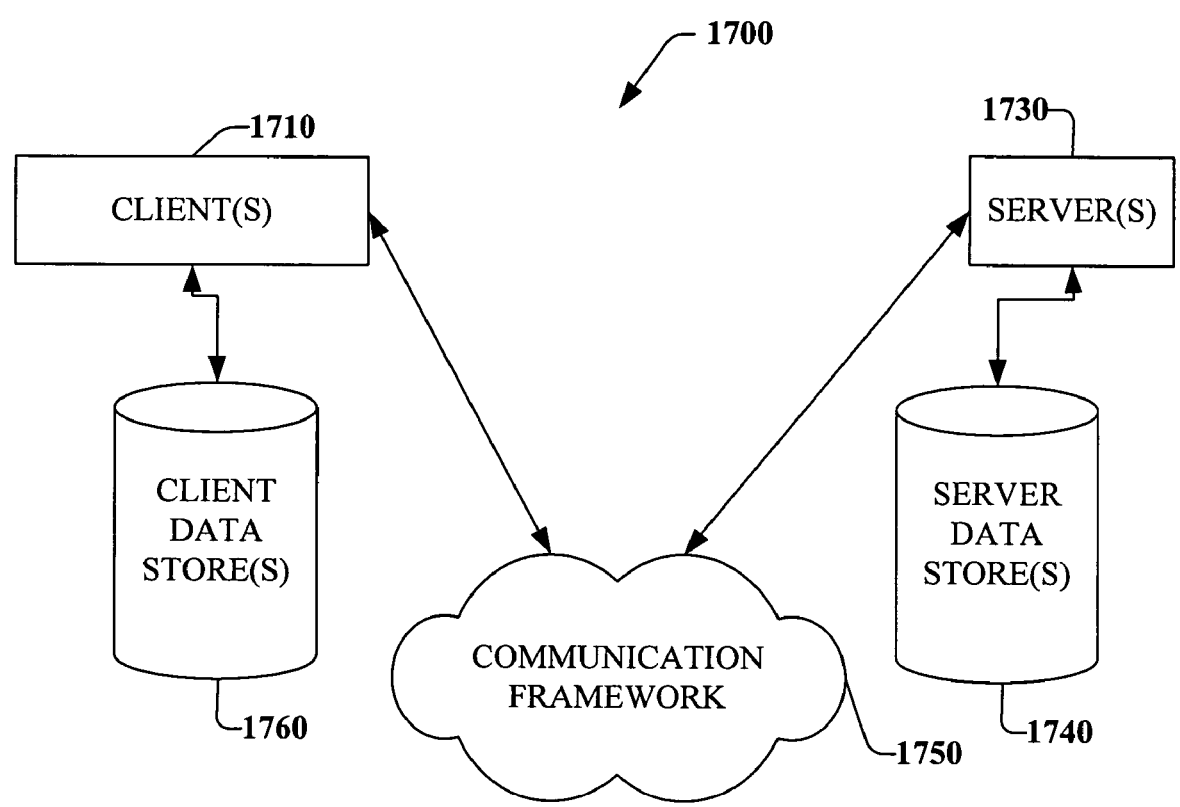
FIG. 17 is an exemplary computing environment within which various features described herein can interact.

FIG. 17 is a schematic block diagram of a sample-computing environment 1700 with which the subject invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the subject invention, for example. One possible communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation device, comprising:
   a data storage component that retains at least a portion of a schema, the schema transforms data from a flat data structure to a hierarchically structured data model;
   a workflow engine that executes Business Process Execution Language, the workflow engine executes at least one operation based at least in part on utilization of the schema; and
   a processor that facilitates at least one of receipt, execution, and creation of an object that conforms to the hierarchically structured data model.

2. The industrial automation device of claim 1, the hierarchically structured data model is representative of a hierarchical organization of a factory.

3. The industrial automation device of claim 1, the hierarchically structured data model is based at least in part upon one or more common industrial protocols.

4. The industrial automation device of claim 1, the schema instantiates control modules within the industrial automation device.

5. The industrial automation device of claim 1, the schema instantiates equipment modules within the industrial automation device.

6. The industrial automation device of claim 1, the schema instantiates a unit procedure component within the industrial automation device.

7. The industrial automation device of claim 1, further comprising a proxy component that communicates between the industrial automation device and a legacy automation device.

8. The industrial automation device of claim 7, the proxy component comprises a mapping component that maps data from a flat data structure to data that conforms to the hierarchically structured data model.

9. The system of claim 8, the proxy component comprises a bridging component that converts data that conforms to a first network protocol to data that conforms to a second network protocol.

10. The system of claim 9, the second network protocol is a common industrial protocol.

11. The industrial automation device of claim 1, further comprising a security component that ensures that an operator is authorized to review requested data within the industrial automation device prior to providing the operator with the requested data.

12. The industrial automation device of claim 11, the security component administers security to a plurality of industrial automation devices.

13. The industrial automation device of claim 1, further comprising a filtering component that filters data within the industrial automation device based at least in part upon user identity.

14. The industrial automation device of claim 1, further comprising an interface component that provides data within the industrial automation device to a remote entity.

15. The industrial automation device of claim 1 being one of a programmable logic controller, a numerical controller, a robotic controller, an automation controller, a process controller, a smart device, a network switch, and a router.

16. The industrial automation device of claim 1, further comprising an aggregation component that aggregates data from a plurality of industrial devices and makes such data available to higher-level systems.

17. The industrial automation device of claim 1, the workflow engine executes a workflow.

18. A computer implemented methodology for enabling utilization of structured data within an industrial automation device, comprising:
receiving data from the industrial automation device;
associating at least a portion of a schema with the industrial automation device, the schema transforms data from a flat structure to a hierarchically structured data model within an industrial automation environment;
executing Business Process Execution Language by a workflow engine, the workflow engine directs usage of the schema by the industrial automation device; and
wherein memory operatively coupled to a processor is capable of retention of at least one piece of information that pertains to the industrial automation device or the schema.

19. The methodology of claim 18, further comprising at least one of receiving, executing, and creating a data object that conforms to the hierarchically structured data model.

20. The methodology of claim 18, further comprising ensuring that an entity requesting access to the industrial automation device is authorized to access such device.

21. The methodology of claim 18, the hierarchically structured data model is based at least in part upon one or more common industrial protocols.

22. The methodology of claim 18, the industrial automation device is one of a numeric controller, a robotic controller, a programmable logic controller, an automation controller, a process controller, a smart device, a switch, a router, a proxy, and a gateway.

23. The methodology of claim 18, further comprising:
receiving data that is structured in a flat manner; and
utilizing templates to convert the data so that it conforms to the hierarchically structured data model.

24. The methodology of claim 18, further comprising:
receiving data that is formatted in accordance with a first industrial protocol; and
re-packaging the data so that it can be transmitted by way of a second industrial protocol.

25. The methodology of claim 24, the second industrial protocol is a common industrial protocol.

26. The methodology of claim 18, further comprising executing a workflow within the industrial automation device.

27. An industrial automation device embodied on a computer readable storage medium, comprising:
means for implementing a schema that instantiates objects in accordance with a hierarchically structured data model by the industrial automation device;
means for executing Business Process Execution Language by a workflow engine, the workflow engine manages the implementation of the schema; and
means for processing data objects from a flat data structure to data that conforms to the hierarchically structured data model.

28. The industrial automation device of claim 27, further comprising means for converting data structured in a flat manner to data that conforms to the hierarchically structured data model.

29. The industrial automation device of claim 27, further comprising means for executing a workflow.

30. An industrial automation component, comprising:
a processor;
a memory communicatively coupled to the processor, the memory having stored therein computer-executable instructions to implement a system, including:
a schema that instantiates objects in accordance with a hierarchically structured data model;
a workflow engine that executes Business Process Execution Language to manage implementation of the schema; and
a mapping component for processing data objects from a flat data structure to data that conforms to the hierarchically structured data model.

* * * * *